United States Patent Office 3,549,663
Patented Dec. 22, 1970

3,549,663
ANTIBACTERIAL AGENTS
Lloyd H. Conover, Quaker Hill, Conn., and James D. Johnston, Allendale, N.J., assignors to Chas. Pfizer & Co., Inc., New York, N.Y., a corporation of Delaware
No Drawing. Continuation-in-part of applications Ser. No. 26,414, May 3, 1960, and Ser. No. 209,240, July 11, 1962. This application Nov. 22, 1966, Ser. No. 596,095
Int. Cl. C07c 65/20, 69/76, 97/10
U.S. Cl. 260—351                                    5 Claims

ABSTRACT OF THE DISCLOSURE

The synthesis of novel 3,4,10-trioxo-1,2,3,4,4a,9,9a,10-octahydroanthracenes, of value as antimicrobial and complexing agents and as intermediates for preparation of tetracycline-type compounds by a multi-step process comprising: (a) A Claisen-type condenastion of benzoic acid ester with succinic acid diester or an alkanoic acid ester to provide a benzoyl succinate or acetate; (b) alkylation of the succinate or acetate to produce a benzoyl adipate; (c) partial or complete reduction of the benzoyl adipate to an α-hydroxybenzyl or benzyl adipate by chemical or catalytic methods; (d) conversion of the α-hydroxybenzyl adipate by known methods to an α-amino, α-hydroxy or alkoxy alkyl or α-formylbenzyl adipate; (e) cyclization of the benzyl adipate compounds to 2-(2-carbalkoxyethyl)-4-tetralones by means of dehydrating agents; (f) cyclization of the tetralones by condensation with a dialkyl oxalate to give a 2-carbalkoxy-3,4,10-trioxooctahydroanthracene; and (g) removal of the 2-substituent by decarboxylation.

This application is a continuation-in-part of U.S. Ser. No. 209,240, filed July 11, 1962 and now abandoned, which in turn is a continuation-in-part of Ser. No. 26,414, filed May 3, 1960, and now abandoned.

This invention is concerned with certain new and useful chemical intermediates and the proces for their production.

In application Ser. No. 24,895, filed Apr. 27, 1960, there are described new and useful tricyclic ketones and intermediates for their production. One such class of intermediates is included under the following formula:

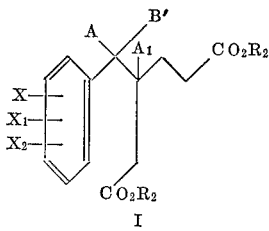

In the formula, X is selected from the group consisting of hydrogen, hydroxy, trifluoromethyl, lower alkyl, amino, mono and di-lower alkylamino, alkanoylamino containing from 2 to 4 carbon atoms, alkanoyloxy containing from 2 to 4 carbon atoms; and OR wherein R is selected from the group consisting of lower alkyl and benzyl;

$X_1$ is selected from the group consisting of hydrogen, chloro, lower alkyl, trifluoromethyl;

$X_2$ is selected from the group consisting of hydrogen, hydroxy, and OR, wherein R is as previously defined;

A is selected from the group consisting of hydrogen and lower alkyl, $A_1$ is selected from the group consisting of hydrogen, and $COOR_1$ in which $R_1$ is selected from the group consisting of lower alkyl and benzyl;

B' is selected from the group consisting of hydrogen, and hydroxy, and $R_2$ is selected from the group consisting of hydrogen, lower alkyl and benzyl.

Additionally, as hereinafter described, A and B' taken together may be $R_3O(R_4)C=$ or $R_4CH=$; and when A is hydrogen B may be amino, mono- or dialkylamino, $R_3O(R_4)CH-$, $HO(R_4)CH-$ or $OCH-$, wherein $R_3$ is lower alkyl and $R_4$ is hydrogen or lower alkyl; and $A_1$ may be converted to carboxy.

Compounds of structure I are particularly useful in synthesizing 6-deoxytetracycline, 6-deoxy-6-demethyltetracycline and various novel antimicrobial agents bearing structural similarities to the known tetracycline antibiotics.

New compounds of the present invention which are useful as intermediates for the production of compounds of Formula I are represented by the following formula:

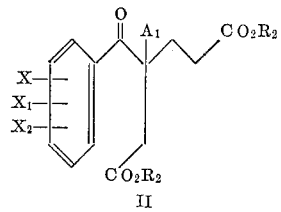

wherein X, $X_1$, $X_2$, $A_1$ and $R_2$ are as previously defined. Additionally, these substituents may be replaced by other valuable groupings, according to procedures described hereinafter. Thus, X, $X_1$ and $X_2$ may be transformed to hydroxy, nitro, cyano, bromo, carbalkoxy, hydroxyalkyl, alkyl sulfonyl, halo sulfonyl, alkyl sulfinyl and sulfamyl.

It should be noted that whereas the X, $X_1$ and $X_2$ substituents are arranged in that order in the generic structure, this representation is for convenience only. In actual practice these groups can occur in any sequence in the benzenoid moiety.

The new compounds of Formula II are converted to corresponding compounds of Formula I by various means. For example, hydrogenation in a reaction-inert solvent over a noble metal, e.g. palladium, platinum or rodium catalyst, or Clemmensen reduction with zinc and HCl, yields Formula I compounds in which A and B' are each hydrogen when two molar equivalents of hydrogen are taken up. Further hydrogenation may occur in compounds containing additional reducible groups, e.g. particularly chloro or carbobenzyloxy groups. Hydrogenolysis of benzyl ester groups or halogen produces corresponding reduction products. When $A_1$ is a carbobenzyloxy group in compounds of structure II, hydrogenolysis of this group is followed by decarboxylation of the resulting β-keto acid. (However, the competing reaction is hydrogenolysis of the benzoyl keto group of structure II compounds, to form first the secondary alcohol of structure I and finally the compounds I wherein $A=B'=H$. These structure I compounds may be recovered in the form of the relatively stable β-carboxy adipate without decarboxylation. Thus, if decarboxylation is desired, the β-carbobenzyloxy, β-benzoyl adipate II is first hydrogenolyzed in neutral, e.g. ethanolic, solution—which favors initial hydrogenolysis of the benzyl ester group; decarboxylation then ensures, and the benzoyl keto group may subsequently be hydrogenolyzed, preferably in acetic acid.)

If it is desired to retain halogen, the reduction should be carried out in the presence of an acid, e.g. lower alkanoic acids such as acetic and propionic acid. Of course, halogen, If removed, may be introduced into the molecule by standard methods of halogenating aromatic compounds with known chlorinating or brominating agents. Such reintroduction of halogen may be directed to the original substituent position provided that this position is para to a hydroxy, alkoxy, amino or like substituent. A variety of appropriate halogenating agents are known, including phosphorus pentachloride and pentabromide, sulfuryl chloride, N-chloro or bromoalkanoamides, e.g. N-chlor- and N-bromacetamide; N-chloro (or bromo)alkanedioic acid imides, e.g. N-halosuccinimide; N-halophthalimide; chlorine; bromine; N-haloacylanilides, e.g. N-bromoacetanilide, propionanilide and the like; 3-chloro, 3-bromo, 3,5-dichlor, and 3,5-dibromo-5,5-dimethylhydantoin; pyridinium perbromide and perchloride hydrohalides, e.g. pyridinium perbromide hydrobromide; and lower alkyl hypochlorites, e.g. t-butylhypochlorite.

The reaction of compounds of Formula II with lower alkyl Grignard reagents affords compounds in which A is lower alkyl and B' is hydroxy. Catalytic hydrogenolysis of such compounds, e.g. hydrogen over palladium, results in removal of the hydroxy group to yield compounds in which B' is hydrogen.

In the above mentioned catalytic reductions to provide compounds in which A is hydrogen or alkyl and B is hydrogen, the products obtained are compounds of the formula:

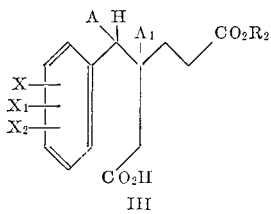

wherein X, $X_1$, $X_2$, $R_2$, A and $A_1$ are as previously described, except that $A_1$ is not carbobenzyloxy and $R_2$ is not benzyl. These compounds are converted to corresponding free acids and any desired esters by conventional procedures.

The carbalkoxy and carbobenzyloxy groups representative of $A_1$ in Formula II compounds may be hydrolyzed and decarboxylated to provide compounds of Formula II in which $A_1$ is hydrogen. The usual method of acid hydrolysis is useful for this purpose. The resulting compounds are the corresponding dicarboxylic acids which are preferably reesterified although they may be utilized in the free acid form in subsequent reactions.

An amino group may also be introduced in place of the keto carbonyl oxygen of compounds of structure II by reduction of the corresponding oxime or hydrazone or by reductive amination of the keto carbonyl group over noble metal catalysts.

A further means is provided for introducing a variety of substituents in positions corresponding to the 5a and 6-position of the tetracycline nucleus by formation of the secondary alcohols corresponding to structure II compounds, as previously discussed, particularly those secondary alcohols represented by the formula:

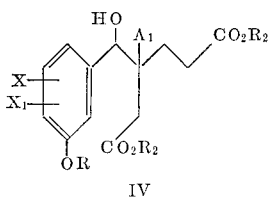

preferably by partial reduction of the corresponding ketone with sodium borohydride or, in the case where $A_1$ is not carbobenzyloxy, by hydrogenation over palladium catalyst in non-acidic media until only one molar equivalent of hydrogen is taken up. The OH group of the resulting secondary alcohol can then be subjected to known replacement procedures such as the following: The secondary alcohol may be converted to a readily replaceable sulfonic ester group, e.g. the tosylate, mesylate, etc., followed by reaction with ammonia or a primary or secondary amine to provide compounds of the formula:

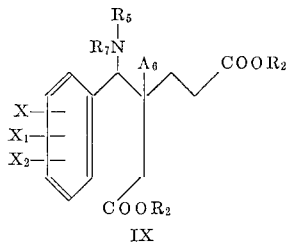

wherein $R_5$ and $R_7$ are hydrogen or lower alkyl, and $A_6$ includes the designations applied to $A_1$ as well as carboxy. Of course, where $R_5$ or $R_7$=H, compounds of structure IX tend to form lactams, but may be retained in the open structure shown by acylation of the amino group with a lower alkanoic acid anhydride.

Alternatively, the tosylate, mesylate, etc., derivatives prepared from the secondary alcohols of structure I may be subjected to replacement reactions with a malonic ester, thus affording means for introduction of a —$CH(CO_2R_3)_2$ group. The secondary alcohol IV wherein $A_1$ is hydrogen may also be dehydrated to the corresponding unsaturated compound (by treatment with HF) and the unsaturated compound reduced to the corresponding benzyl derivative. Compounds of structure IV are also intermediates for the preparation of 6-demethyltetracyclines.

Other modifications provide means for introducing an alkylidene group. The benzoyl keto group of compounds of structure II may be subjected to the Wittig reaction, described in Angewandte Chemie, 71, 260–273 (1959) and other publications, with the following result:

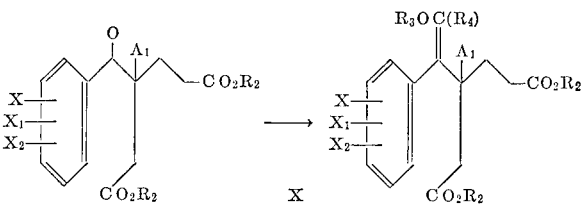

This reaction is effected by treatment of the benzoyl compound with the ylid prepared from a chloroether of the formula $(R_4)CHCLOR_3$ (where $R_3$ is lower alkyl and $R_4$ is hydrogen or lower alkyl). The necessary chloroethers are obtained by treatment of an aldehyde acetal of the formula $R_4CH(OR_3)_2$ with an acid chloride, as described by Post (J. Org. Chem. I, p. 231, 1936).

The products of the above reaction may in turn be hydrogenated with noble metal catalysts:

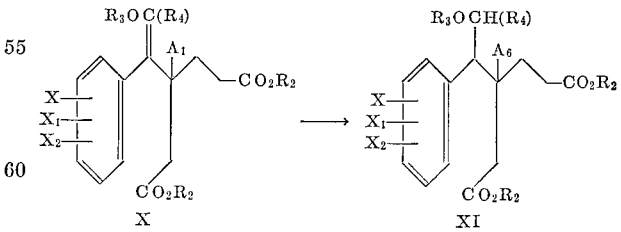

(where $A_6$ includes the designations ascribed to $A_1$ as well as carboxy). Subsequent treatment with liquid hydrogen fluoride results in the elimination of a mole of alcohol $R_3OH$ and provides a =$CH(R_4)$ group at the tetracycline 6-position. The latter treatment is conveniently effected after conversion to the tetracycline has been completed. Alternatively, treatment of compounds having a

—$CH(R_4)OR_3$ substituent with HBr converts this group to —$CH(R_4)OH$ with concurrent hydrolysis of any ether groups in the aromatic D-ring as well as any ester groups, e.g. $A_1$.

The products of the Wittig reaction may also be hydrolyzed, conveniently by treatment with dilute mineral acid, e.g. HCl:

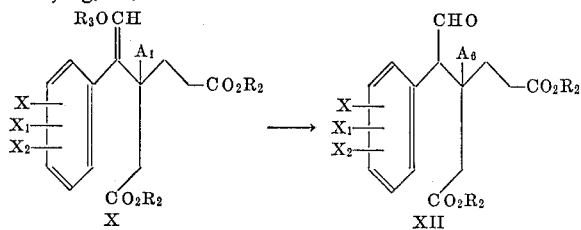

and the resulting aldehyde group in turn converted to a hydroxymethyl group by hydrogenation over noble metal catalyst, e.g. platinum oxide. The resulting hydroxymethyl adipates may in turn be converted to the corresponding lower alkyl ethers by treatment with diazoalkanes, preferably diazomethane, in the presence of fluoboric acid (the method of Roberts et al., Journal of the American Chemical Society, volume 80, p. 2584, 1958) or in the presence of boron trifluoride etherate (the method of Mueller et al., Ang. Chemie, volume 70, 105, 1958). Where $R_2$ is hydrogen, these procedures lead to concurrent esterification of the carboxyl groups, and it is therefore necessary, of course, to provide additional diazomethane.

When the substituents of the present compounds are hydroxy or amino the use of a blocking group is sometimes advantageous in obtaining high yields during their preparation. Especially useful blocking groups are acyl, benzyl, tetrahydropyranyl, methoxymethyl, methyl and ethyl radicals. Benzyl ethers are particularly easily reduced to hydroxyl groups. Hydroxyl groups are conveniently protected during basic reaction steps by prior conversion to the tetrahydropyranyl ether, which is easily re-hydrolyzed under mildly acidic conditions. Where carboxylic acid groups are present in the molecule, these should be esterified prior to tetrahydropyranyl ether formation, to avoid formation of tetrahydropyranyl esters. Acyl groups which may be used include the acetyl, propionyl, butyryl, benzoyl and the like. The lower alkyl blocking groups are preferred because of the ease with which these compounds are prepared.

Compounds of Formula II may be prepared according to the following reaction sequence.

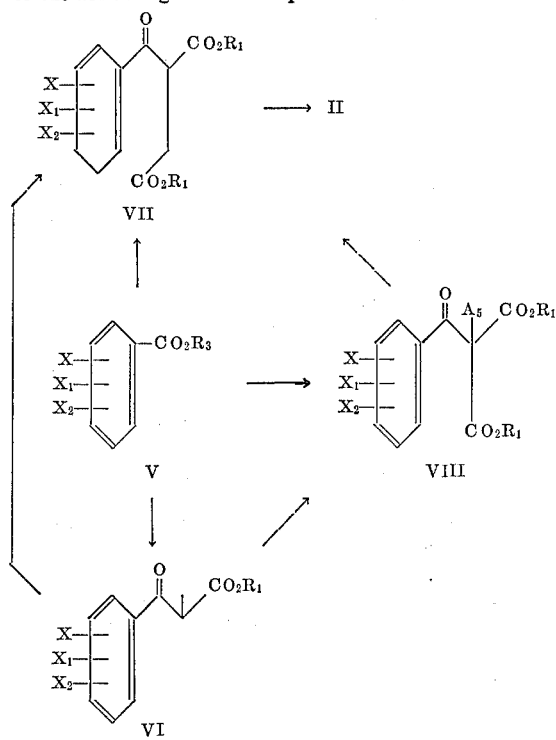

In the above sequence, $A_5$ is hydrogen or lower alkyl. The conversion of compounds of Formula V to those of VII is a Claisen-type condensation of the lower alkyl $(R_3)$ ester of V with succinic acid diesters to provide Formula VII compounds in which $A_5$ is hydrogen. The conversion of compounds of Formula V to VI is similarly a Claisen condensation of the lower alkyl $(R_3)$ ester of V with succinic acid diesters to provide Formula VII compounds in which $A_5$ is hydrogen. The conversion of compounds of Formula V to VI is similarly a Claisen condensation using esters of the formula $A_5$—$CH_2CO_2R_1$ in which $R_1$ and $A_5$ are as previously described; and the conversion of compounds V to compounds VIII is a Claisen condensation with a glutarate of the formula

$$R_1OOCCHA_5CH_2CH_2\text{—}COOR_1$$

The conversion of compounds of formulae VI to VII and VIII to II is by alkylation reaction with a monohaloacetic acid ester. Formula II compounds in which $A_1$ is hydrogen or alkyl are obtained by alkylation of Formula VIII compounds in which $A_5$ is hydrogen or alkyl after hydrolysis and decarboxylation of same; and Formula II compounds in which $A_1$ is carbalkoxy are obtained by alkylation of Formula VIII compounds in which $A_5$ is hydrogen. The preparation of compounds of Formula VIII from those of Formula VI is by standard alkylation procedures, preferably using an acrylic acid ester of the formula $H_2C$=$CHCO_2R_1$ or the corresponding nitrile. Where $A_2$ is hydrogen or lower alkyl, this conversion may also be effected by alkylation with a β-haloacid derivative of the formula halogen-$CH_2CH_2CO_2R_1$ or the corresponding nitrile. Each of these reactions is effected under standard conditions known to those skilled in the art, e.g. in a reaction-inert solvent in the presence of a base such as Triton B (benzyltrimethylammonium hydroxide), sodamide, sodium hydride and their obvious equivalents.

The conversion of compounds of Formula VII to those of II is effected by known standard reactions. For compounds of Formula II in which $A_1$ is $CO_2R_1$, by reaction of Formula VII compounds in which $A_5$ is hydrogen with corresponding acrylic acid esters of the formula $H_2C$=$CHCO_2R_2$ in which $R_2$ is as previously described, under the conditions of the Michael reaction. It may also be effected by alkylation with β-haloalkanoic acids of the formula halogen-$CH_2CH_2CO_2R_2$ or the corresponding nitriles. For those in which $A_1$ is hydrogen, hydrolysis and decarboxylation of those in which $A_1$ is $CO_2R_1$ may be used. Compounds of Formula II in which $A_1$ is alkyl are prepared by hydrolysis and decarboxylation of compounds of Formula VII in which $A_5$ is alkyl, followed by alkylation with β-haloalkanoic or α,β-unsaturated acid derivatives as hereinbefore described, preferably in the presence of methylmagnesium carbonate. It is sometimes found advantageous to first convert the remaining ester group to a carboxamide group, e.g. by treatment of the ester with ammonia, before the alkylation reaction to obtain improved yields. The alkyl substituent representative of $A_1$ may also be introduced by direct alkylation of compounds of structure VI or VII in which $A_5$ is hydrogen with an alkyl halide by conventional procedures, e.g. in the presence of a strong base such as alkali metals or alkali metal hydrides or alkoxides.

Of particular value are compounds of structure II and the intermediates therefor, VI, VII and VIII, containing the following substituted benzene ring:

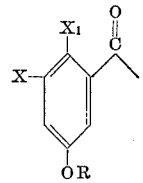

in which R, X and $X_1$ are as previously described, since these compounds are useful in the synthesis of known tetracyclines as well as new and useful tetracycline derivatives not previously described, as discussed in application Serial. No. 24,895. Of course, the position ortho to substituent OR and the carbonyl group should be unsubstituted. Additionally, the present new compounds are also converted to tetracyclines not preparable by the methods described in that application, e.g. tetracyclines containing the hereindescribed substituent $A_1$ in the 5a-position, and the substituents $R_5R_7N-$, $R_3O(R_4)CH-$ or $$HO(R_4)CH-$$

in the 6-position. Such tetracycline compounds are prepared from correspondingly substituted 3,4,10-trioxo-1,2, 3,4,4a,9,9a,10-octahydroanthracenes which in turn are prepared from correspondingly substituted compounds of structure II herein by the same general method described in the aforementioned application. This method is summarized in the flow sheets which follow.

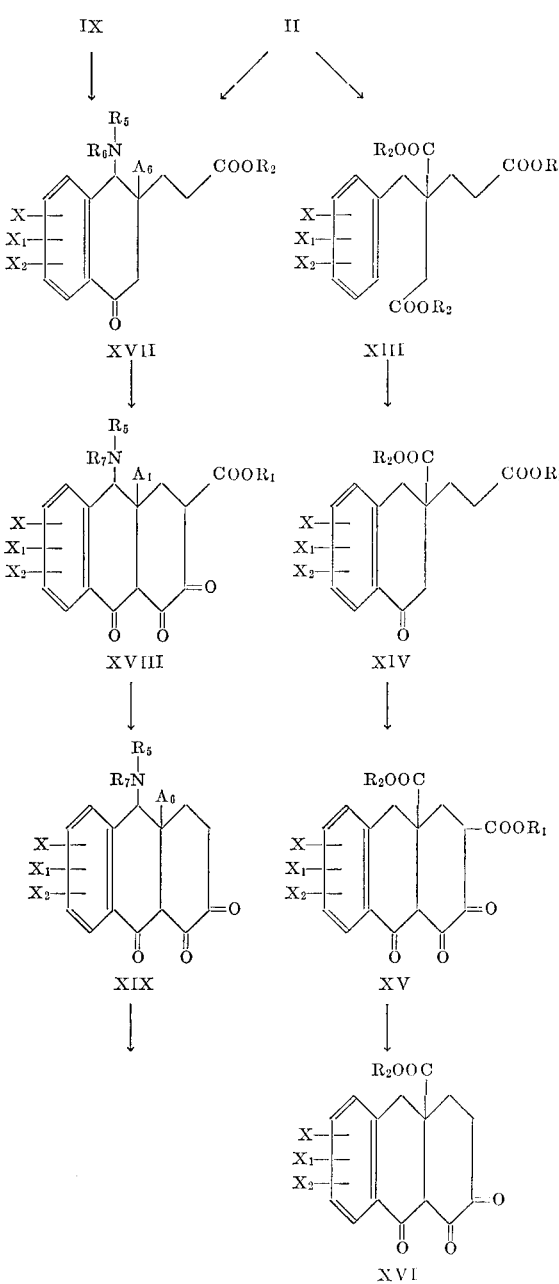

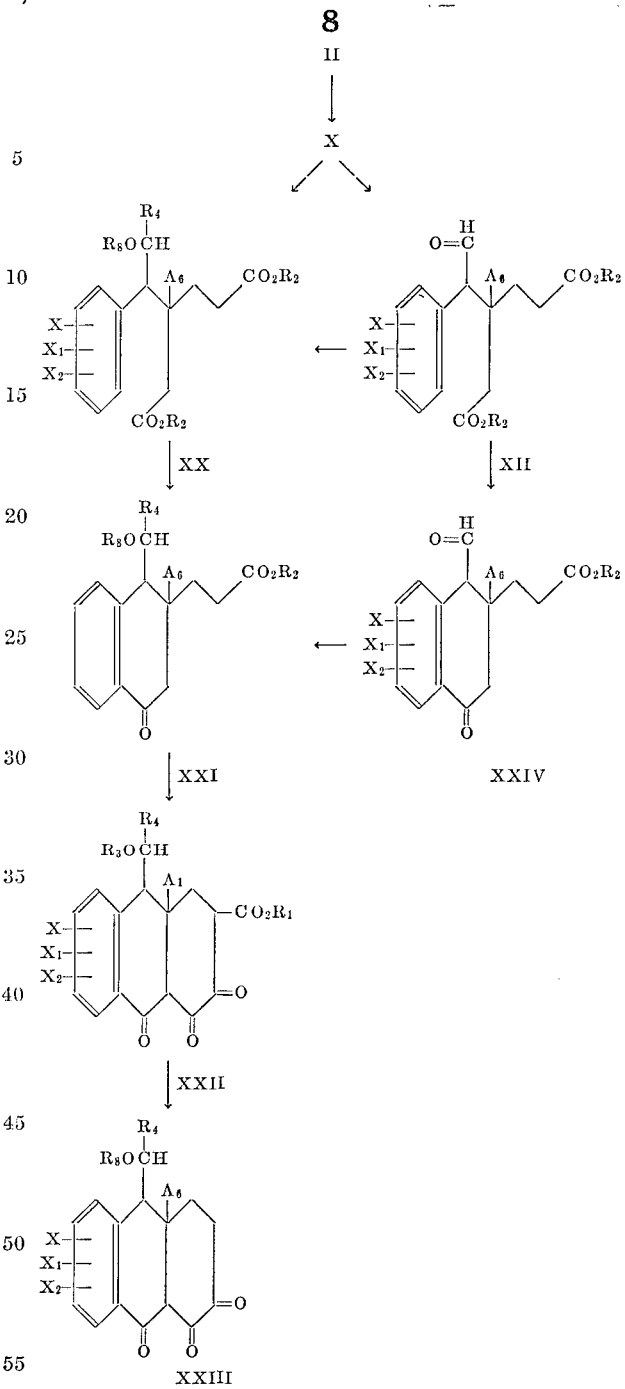

In these reaction sequences, $A_1$, $R_1$, $R_2$, $R_4$, $R_5$, $R_7$, X, $X_1$ and $X_2$ are as previously defined. $A_6$ is hydrogen, lower alkyl, carboxyl, lowercarbalkoxy, or carbobenzyloxy; $R_6$ is lower alkyl or lower alkanoyl, $R_6$ being alkanoyl when $R_5$ is hydrogen; and $R_8$ is hydrogen or lower alkyl.

Among the reactions shown, the following have already been discussed:

II→XIII Hydrogenolysis of the benzoyl keto group.

II→IX Hydrogenolysis of II to the corresponding secondary alcohol and conversion of the latter via the tosylate to the α-aminobenzyl adipate.

II→X The Wittig reaction.

X→XX Hydrogenation of an alkoxymethylene adipate to form the corresponding alkoxymethyl adipate ($R_8$=alkyl)

which may be converted to the hydroxymethyl adipate ($R_8$=H) by HBr treatment.

X→XII Hydrolysis of an alkoxymethylene adipate ($R_4$=H) to the aldehyde.

The following reactions represent ring closure by treatment of the starting compound with such agents as hydrogen fluoride or polyphosphoric acid, as described in application Serial No. 24,895:

IX→XVII
XIII→XIV
XX→XXI
XII→XXIV

When $R_2$ in the starting compound is hydrogen, it is usually preferred to use hydrogen fluoride; when $R_2$ is lower alkyl, polyphosphoric acid. Compounds of Structure XII should be converted to the acetal for this reaction, the formyl group in Compounds XXIV being regenerated by hydrolysis with dilute mineral acid. Compounds of Structure XX are employed as the alkoxymethyl adipates ($R_8$=alkyl) to form corresponding tetralones XXI; Compounds XXI wherein $R_8$=H are prepared from these products by HBr treatment as before. Compounds XX and XXI wherein $R_2$=$R_8$=H tend to form lactones, which are converted to XX and XXI wherein $R_2$=alkyl by treatment with sodium hydroxide and a dialkyl sulfate.

The following reactions represent condensation of a tetralone, wherein $R_2$ is lower alkyl or benzyl and $A_6$ is other than carboxy, with oxalic ester as described in application Ser. No. 24,895:

XVII→XVIII
XIV→XV
XXI→XXII

This step is effected by the general methods for ester condensation reactions of this type. Usually the reaction is carried out in the presence of a strong base such as alkali metal, alkali metal alkoxides and hydrides, sodamide and the like. If the starting compound in the oxalate condensation contains free hydroxyl, amino or mercapto groups, it is preferred to block such groups by akylation or acylation by known procedures. Compounds XXI are employed as the alkoxymethyl tetralones ($R_8$=alkyl) in this reaction, forming the correspondingly substituted octahydroanthracenes XXII.

The following reactions represent hydrolysis and decarboxylation of the 2-carbalkoxy or -carbobenzyloxy octahydroanthracenes, as described in aforesaid application Ser. No. 24,895:

XVIII→XIX
XV→XVI
XXII→XXIII

This procedure results in concurrent hydrolysis of any other carbalkoxy or carbobenzyloxy substituents which may be present at the 9a-position or elsewhere in the molecule, and these may be re-esterified if desired. Compounds XXII introduced to this step are the 9-alkoxyalkyl octahydroanthracenes, yielding correspondingly substituted compounds XXIII which are convertible to 9-hydroxymethyl-substituted compounds XXIII by HBr treatment as before.

XII→XX and XXIV→XXVI represent reduction of the formyl-substituted compounds to the corresponding hydroxymethyl-substituted derivatives XX and XXI ($R_4$=$R_8$=H) as previously discussed. In the case of compounds XXIV, sodium borohydride treatment is a preferred procedure, since catalytic hydrogenation may reduce the tetralone keto group. Treatment of these products with diazoalkanes by the procedures outlined earlier provides compounds XX and XXI wherein $R_4$=hydrogen and $R_8$=lower alkyl.

The new tricyclic intermediates of the present invention including those of structures XV–XVI, XVIII–XIX and XXII–XXIII, in addition to their value in synthesis, are also useful by virtue of their antimicrobial activity, particularly against gram-positive organisms and fungi. They may be employed as bacteriostatic and fungistatic agents, and are further useful in separation and classification of organisms for medical and diagnostic purposes.

It will be apparent to those skilled in the art that these compounds may be employed in the same manner as known bacteriostatic and fungistatic agents for the purposes outlined.

These new intermediates, of structures XV–XVI, XVIII–XIX and XXII–XXIII, by virtue of their β-diketone structure, are also valuable chelating, complexing or sequestering agents, and form particularly stable and soluble complexes with polyvalent cations. They are therefore useful wherever removal of such polyvalent ions is desired, e.g. in biological experimentation and in analytical procedures. Of course, as is well known to those skilled in the art, such β-diketones may exist in one or more of several tautomeric forms as a result of their ability to enolize. It is fully intended that the β-diketone structures herein employed embrace such tautomers.

The herein described procedures are adaptable to the introduction of a variety of other substituents, as follows:

For introduction of aromatic nitro groups, the given compound, e.g. tetralone XXI, is nitrated by standard procedures, such as treatment with nitric acid-acetic anhydride-acetic acid mixtures, or nitric-sulfuric acid mixtures. Those in which X is halogen, cyano, halo sulfonyl, nitro or other such groups may be prepared by Sandmeyer reaction of the corresponding diazonium salt is obtained by diazotization of the amino compound, which may in turn be prepared by reduction of the corresponding nitro compound by conventional means, e.g. chemical reduction with active metals (Sn) and mineral acids (HCl) or catalytic hydrogenation, e.g. with nickel catalyst at superatmospheric pressure. Aromatic cyano groups may be further converted to carboxy or carbalkoxy groups where desired by standard hydrolysis and esterification; and alkylmercapto groups oxidized to alkylsulfinyl and alkylsulfonyl.

The amino group may also be introduced into the benzenoid ring, e.g. in compounds of structure I having a phenolic hydroxyl group, by coupling with aryldiazonium salts such as benzene diazonium chloride or the diazonium salt of p-aminobenzenesulfonic acid, followed by reduction of the resulting phenylazo compound, e.g. by catalytic hydrogenolysis with noble metal catalysts.

As has been previously pointed out, normal discretion should be employed in subjecting certain of the substituted intermediates to the herein described reaction steps. In the base condensation reactions, the presence of a substituent having an active hydrogen (e.g. a hydroxyl or amino group) will necessitate the use of an additional mole of the sodium hydride or other base. The presence of more than one such substituent per molecule is preferably avoided in these reactions, e.g. by the use of protective ether groups as previously described. The same considerations apply to Grignard reactions and hydride reductions. Hydroxyl groups can be subsequently regenerated from their ethers by conventional hydrolytic procedures such as treatment with hydrogen bromide. Similarly, protective benzyl ether groups can subsequently be hydrogenolyzed to obtain hydroxyl groups where desired.

In the reduction of benzoyl adipate II to the corresponding benzyl derivative I, chemical reduction with amalgamated zinc and HCl by the well known Clemmensen procedure may be employed in place of catalytic hydrogenolysis. Any ester groups which may be present in the molecule may be concurrently hydrolyzed in the Clemmensen procedure, and reesterification may therefore be necessary.

Further, in the reduction of benzoyl adipate II to corresponding benzyl derivative I, a three-step procedure is an appropriate alternative to direct reduction; i.e. (1) conversion of the keto group to hydroxyl, e.g. with sodium borohydride or by mild reduction at room temperature with palladium on carbon in alcohol or other neutral solvent; (2) conversion of the resulting alcohol to the unsaturated compound by dehydration in anhydrous hydrogen fluoride; and (3) rapid hydrogenation of the resulting double bond, e.g. with palladium at room temperature and moderate hydrogen pressure, until one mole of hydrogen has been consumed. An alternative reduction procedure which is suitable where one or more of the enumerated sensitive groups are present is the Wolf-Kishner reaction (Annalen, 394, 90, 1912 and J. Russ. Phys. Chem. Soc., 43, 582, 1911) wherein the benzoyl derivative is converted to a hydrazone, and the latter is in turn reduced to the corresponding benzyl derivative by heating with a base such as sodium ethoxide.

The starting compounds for the present process are readily preparable by standard methods known to those skilled in the art. A number of these have been described in the literature.

The following examples are given by way of illustration and are not to be construed as limitations of this invention, many variations of which are possible within the scope and spirit thereof.

EXAMPLE I

Methyl ester of (3-methoxybenzoyl)acetic acid

To a mixture of 16.6 g. (0.1 mole) of methyl 3-methoxybenzoate and 10 g. (0.2 mole) of sodium hydride (48% dispersion in oil) in 300 ml. of dry dimethylformamide is added a solution of 8.0 g. of methyl acetate in 150 ml. of dry dimethylformamide dropwise with stirring at room temperature during a period of 4 hours. The mixture is then stirred for an additional two hours, after which it is acidified slowly with glacial acetic acid. The acidified mixture is poured into excess water which is next extracted with chloroform. The chloroform extract is dried over anhydrous sodium sulfate and then evaporated under reduced pressure to an oil. The residual oil is washed with hexane and distilled in vacuo to obtain 10.57 g. of the methyl ester product, B.P. 128–131° C./(0.5 mm.), $n_D^{25}=1.5428$. Infrared analysis shows characteristic peaks at 5.73 and 5.92μ.

Elemental analysis gives the following results:

Calcd. for $C_{11}H_{12}O_4$ (percent): C, 63.47; H, 5.81. Found (percent): C, 63.28; H, 5.89.

EXAMPLE II t-Butyl ester of (3-methoxybenzoyl)acetic acid

To a stirred suspension of sodamide in liquid ammonia (prepared from 11.5 g. of sodium in 400 ml. of liquid ammonia) is added 54 g. of t-butyl acetate in 50 ml. of dry ether followed by a solution of 41.5 g. of methyl-3-methoxybenzoate in 50 ml. of dry ether. The ammonia is then replaced by 100 ml. of ether and the mixture refluxed for 2 hours. After standing at room temperature for 12 hours, the mixture is poured into 400 ml. of ice water containing 28.8 ml. of acetic acid. The mixture is then extracted with ether, the etherate washed with 2% sodium bicarbonate solution and then dried over anhydrous sodium sulfate. After removal of the ether at reduced pressure, the residual oil is distilled in vacuo to obtain 33.5 g. of product, B.P. 126–128° (0.3 mm.). Infrared absorption of the product shows characteristic maxima at 5.75 and 5.90.

EXAMPLE III

Ethyl 3-carbomethoxy-3-(3-methoxybenzoyl)propionate

*Method A.*—To a suspension of 26 g. of sodium hydride in 250 ml. of dry dimethylformamide is added dropwise with stirring at room temperature a solution of 108 g. of the Example I methyl ester in 250 ml. of dry dimethylformamide over a period of 45 minutes. The mixture is stirred for an additional 30 minutes and there is then added dropwise with stirring a solution of 104 g. of ethyl bromoacetate in 250 ml. of dry dimethylformamide. The mixture is allowed to stand for 12 hours and is then evaporated under reduced pressure. The residual oil is dissolved in chloroform and the solid sodium bromide filtered. The chloroform solution, after water-washing and drying over sodium sulfate, is evaporated and the residual oil distilled in vacuo to obtain 112.5 g. of product, B.P. 182–188° C. (1.4–1.5 mm.). Infrared analysis of the product shows characteristic peaks at 5.75 and 5.91 microns.

Elemental analysis gives the following results:

Calcd. for $C_{15}H_{18}O_6$ (percent): C, 61.21; H, 6.17. Found (percent): C, 61.39; H, 6.23.

Ethyl and propyl 3-carbethoxy-3-(3-methoxybenzoyl)propionate are prepared in similar fashion.

*Method B.*—To a mixture of 29 g. of methyl 3-methoxybenzoate and 15 g. of sodium hydride in 75 ml. of dry dimethylformamide is added a solution of 19 g. of dimethyl succinate in 175 ml. of the same solvent dropwise with stirring at room temperature during 12–14 hours. The mixture is carefully acidified with 25 ml. of acetic acid and stirred at room temperature for an additional 3 hours. The filtered reaction mixture is next evaporated to a residue consisting of an oil and solid which is treated with ether to dissolve the oil. The ether solution is filtered and evaporated under reduced pressure to yield 18.29 g. of dimethyl α-[3-methoxybenzoyl]succinate, B.P. 162.9° C. (0.40–0.5 mm.). Infrared analysis of the product shows characteristic peaks at 5.75 and 5.90 microns.

Elemental analysis gives the following results:

Calcd. for $C_{14}H_{16}O_6$ (percent): C, 59.99; H, 5.75. Found (percent): C, 59.91; H, 5.79.

In similar manner, the corresponding diethyl, dipropyl and di-t-butyl esters are prepared.

EXAMPLE IV

Ethyl 3-carbo-t-butoxy-3-(3-methoxybenzoyl)propionate

A mixture of 15.8 g. of the product of Example II, 10.5 of ethyl bromoacetate and 3.02 g. of sodium hydride in 130 ml. of dimethylformamide is treated as in Method A of Example III to obtain this product as a yellow oil. Infrared analysis of the product shows characteristic peaks at 5.75 and 5.90μ. The product is used without distillation in the procedure of Example VI; it is likewise used in the procedure of Example VIII to produce ethyl 3-[carbo-t-butoxy - 3 - (2-cyanoethyl)-3-(3-methoxybenzoyl)]-propionate.

EXAMPLE V

Diethyl 3-carbethoxy-3-(3-methoxybenzoyl)adipate

To a mixture of 102 g. of diethyl α-(3-methoxybenzoyl)succinate in 250 ml. of dioxane and 10 ml. of a 35% solution of benzyltrimethylammonium hydroxide in methanol maintained at 50° C. is added 167 g. of ethyl acrylate in one portion with stirring. Heating and stirring are continued for 30 minutes, after which 10 ml. of glacial acetic acid is added. The mixture is evaporated under reduced pressure to a dark oil which is distilled in vacuo to yield 80.5 g. of the diethyl ester product, B.P. 197° C. (1.0–0.2 mm.). $n_D^{25}=1.5043$. Infrared analysis shows characteristic peaks at 5.76 and 5.92μ.

Elemental analysis gives the following results:

Calcd. for $C_{21}H_{28}O_8$ (percent): C, 61.75; H, 6.91. Found (percent): C, 61.64; H, 6.90.

Dimethyl and dipropyl 3-carbomethoxy-3-(3-methoxybenzoyl)adipate are prepared in similar fashion.

EXAMPLE VI

Diethyl 3-carbo-t-butoxy-3-(3-methoxybenzoyl)adipate

The product of Example IV, a yellow oil, is dissolved in 80 ml. of t-butanol containing 0.75 g. of potassium t-butoxide and 19 g. of ethyl acrylate. The mixture is refluxed for 1.3 hours and then concentrated under reduced pressure to obtain the adipate ester product, a yellow viscous oil, which is used without distillation in the procedure of Method B of Example VIII.

EXAMPLE VII

α-(3-methoxybenzoyl)-α-(2-cyanoethyl)succinic acid diethyl ester

This compound is prepared according to the procedure of Example V using acrylonitrile or β-bromopropionitrile in lieu of ethyl acrylate. The product is vacuum distilled at 212–218° C. (0.45 mm. Hg.). This product is hydrolyzed and decarboxylated to 3-(3-methoxybenzoyl) adipic acid by refluxing in aqueous acetic acid containing sulfuric acid by the procedure of Method A.

Corresponding esters are prepared in the usual manner.

EXAMPLE VIII

Diethyl 3-(3-methoxybenzoyl)adipate

*Method A.*—A mixture of 25 g. of diethyl-3-carbethoxy-3-(3-methoxybenzoyl)adipate in 30 ml. of acetic acid, 10 ml. of concentrated sulfuric acid and 10 ml. of water is refluxed for 36 hours. The mixture is then poured into excess water and extracted with chloroform, the extract dried and evaporated under reduced pressure to an oil. The oil is dissolved in a mixture of 50 ml. of ethanol, 1 liter of ethylene dichloride and 6 ml. of concentrated sulfuric acid and refluxed for 12 hours. The mixture is then poured into water. The ethylene chloride layer is separated, dried and evaporated in vacuo to an oil which is distilled to obtain 5.5 g. of product, B.P. 169–172° C. (0.05 mm.), $n_D^{25}=1.5092$.

Elemental analysis gives the following results:

Calcd. for $C_{18}H_{24}O_6$ (percent): C, 64.27; H, 7.19. Found (percent): C, 64.09; H, 7.19.

In similar fashion, the dimethyl and dipropyl esters are prepared.

*Method B.*—The product of Example VI, a yellow viscous oil, is refluxed in 120 ml. of dry xylene containing 3.0 g. of p-toluenesulfonic acid and cooled and extracted with water. The xylene solution, after drying, is concentrated under reduced pressure and the residual oil vacuum distilled to obtain 6.8 g. of product.

There is also obtained 5.86 g. of the enol lactone:

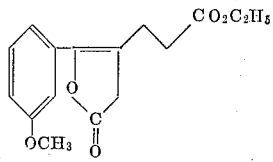

a red oil, which on infrared absorption analysis shows a maximum at 5.58μ.

As is recognized by those in the art, the product of this example is a racemic compound, DL-3-(3-methoxybenzoyl)adipic acid diethyl ester which, as the free acid, lends itself to resolution into its optically active forms by salt formation with optically active bases such as brucine, cinchonine, cinchonidine, morphine and the like to form diastereoisomers. Such procedures are well known to those skilled in the art. Of course, the optically active forms (antipodes) after separation, may be converted one to the other, as desired, by racemization and resolution. The present compound, in one of its optically active forms, is racemized by treating it with a strong base in solvent, e.g. sodium hydride, hydroxide or alkoxide in a lower alkanol. After racemization, the desired optical form may be resolved and the procedure repeated to produce more of the desired optical form from its antipode.

EXAMPLE IX

Employing the procedure of Example I the following compounds are prepared from corresponding starting compounds. Those compounds having an additional active hydrogen require the use of an additional mole of sodium hydride.

methylbenzoylacetate
ethyl (2-ethyl-5-hydroxybenzoyl)acetate
methyl 2-(5-methoxybenzoyl)propionate
methyl 2-(5-methoxybenzoyl)butanoate
methyl 2-(5-methoxybenzoyl)pentanoate
methyl (2-chloro-5-methoxybenzoyl)acetate
methyl (2-dimethylamino-5-methoxybenzoyl)acetate
methyl (2-amino-5-methoxybenzoyl)acetate
methyl (2-acetamido-5-methoxybenzoyl)acetate
ethyl (5-hydroxybenzoyl)acetate
ethyl (3-methoxybenzoyl)acetate
ethyl (3-hydroxybenzoyl)acetate
ethyl (2-methyl-5-hydroxybenzoyl)acetate
ethyl (2,3-dimethyl-5-hydroxybenzoyl)acetate
ethyl (3-isopropyl-5-hydroxybenzoyl)acetate
ethyl (2,3-diethyl-5-hydroxybenzoyl)acetate
ethyl (5-benzyloxybenzoyl)acetate
ethyl (3-methyl-5-hydroxybenzoyl)acetate
ethyl (3-dimethylamino-5-hydroxybenzoyl)acetate
methyl (2,3-dimethylbenzoyl)acetate
ethyl (3,5-dimethoxybenzoyl)acetate
ethyl (2,3-diethyl-5-ethoxybenzoyl)acetate
ethyl (3-isopropyl-5-ethoxybenzoyl)acetate
methyl (2-methylamino-5-methoxybenzoyl)acetate
methyl (3-ethyl-5-methoxybenzoyl)acetate
ethyl (2-methoxy-5-benzyloxybenzoyl)acetate
ethyl (2-propyl-5-propoxybenzoyl)acetate
ethyl (3-trifluoromethyl-5-methoxybenzoyl)acetate
ethyl (3-acetoxy-5-methoxybenzoyl)acetate
propyl (3-propoxybenzoyl)acetate
benzyl (2-chloro-5-methoxybenzoyl)acetate
ethyl (3-benzyloxybenzoyl)acetate
ethyl (3-amino-5-benzyloxybenzoyl)acetate
ethyl (3-propyl-5-methoxybenzoyl)acetate
ethyl (2-isopropyl-3-ethyl-5-methoxybenzoyl)acetate
benzoyl (3-methoxy-5-ethoxybenzoyl)acetate
benzyl (2-chloro-3-methyl-5-methoxybenzoyl)acetate
ethyl (2-chloro-3-dimethylamino-5-methoxybenzoyl) acetate
methyl (2-chloro-4-acetamidobenzoyl)acetate
methyl (2-chloro-3-acetamido-5-methoxybenzoyl)acetate
methyl (2,3-ditrifluoromethyl-5-methoxybenzoyl)acetate
methyl (2-methyl-3-propionyloxybenzoyl)acetate
ethyl (2-trifluoromethyl-3,5-dibutoxybenzoyl)acetate
ethyl (2-trifluoromethyl-3-ethylamino-5-methoxybenzoyl) acetate
ethyl (3-butyrylamidobenzoyl)acetate
ethyl (2-chloro-3-acetoxy-5-ethoxybenzoyl)acetate
ethyl (2-chloro-3,5-dihydroxybenzoyl)acetate
ethyl (3-acetamido-5-hydroxybenzoyl)acetate
ethyl (3-trifluoromethyl-5-hydroxybenzoyl)acetate
methyl 2-(3-methoxybenzoyl)propionate
methyl 2-(3-methoxybenzoyl)butanoate
methyl 2-(3-methoxybenzoyl)pentanoate

EXAMPLE X

The following carbalkoxybenzoyl propionates are prepared from corresponding benzoyl acetates by reaction with α-haloacetic acid esters according to the procedure of Method A of Example III, as well as by the procedure of Method B, Example III, employing the molar proportions of those earlier examples.

ethyl 3-carbomethoxy-3-benzoylpropionate
methyl 3-carbethoxy-3-(2-ethyl-5-methoxybenzoyl)propionate
methyl 3-carbomethoxy-3-(3-methoxybenzoyl)butanoate [1]
methyl 3-carbomethoxy-3-(3-methoxybenzoyl)pentanoate [1]
methyl 3-carbomethoxy-3-(3-methoxybenzoyl)hexanoate [1]
methyl 3-carbomethoxy-3-(3-chloro-5-methoxybenzoyl) propionate ---
[1] The higher benzoyl alkanoates, e.g. butanoate, pentanoate and hexanoate, are prepared from the next lower homolog by the procedure of Method A, Example III.

methyl 3-carbomethoxy-3-(2-dimethylamino-5-methoxybenzoyl)propionate
benzyl 3-carbomethoxy-3-(2-acetamide-5-methoxybenzoyl)propionate
ethyl 3-carbethoxy-3-(2,3-diethyl-5-methoxybenzoyl)propionate
ethyl 3-carbethoxy-3-(3-isopropyl-5-methoxybenzoyl)propionate
ethyl 3-carbethoxy-3-(2-methyl-5-ethoxybenzoyl)propionate
ethyl 3-carbethoxy-3-(3-dimethylamino-5-propoxybenzoyl)propionate
methyl 3-carbomethoxy-3-(2,3-dimethylbenzoyl)propionate
ethyl 3-carbethoxy-3-(3-methoxybenzoyl)propionate
ethyl 3-carbethoxy-3-(2-methyl-5-methoxybenzoyl)propionate
ethyl 3-carbethoxy-3-(4-methyl-5-methoxybenzoyl)propionate
ethyl 3-carbethoxy-3-(2,3-dimethyl-5-methoxybenzoyl)propionate
ethyl 3-carbethoxy-2-(3-benzyloxybenzoyl)propionate
ethyl 3-carbethoxy-3-(3,5-dimethoxybenzoyl)propionate
ethyl 3-carbethoxy-3-(2,3-diethyl-5-ethoxybenzoyl)propionate
ethyl 3-carbethoxy-3-(3-isopropyl-5-ethoxybenzoyl)propionate
methyl 3-carbomethoxy-3-(2-methylamino-5-methoxybenzoyl)propionate
methyl 3-carbomethoxy-3-(3-ethyl-5-methoxybenzoyl)propionate
ethyl 3-carbethoxy-3-(2-methoxy-5-benzyloxybenzoyl)propionate
ethyl 3-carbethoxy-3-(2-propyl-5-propoxybenzoyl)propionate
ethyl 3-carbomethoxy-3-(3-trifluoromethyl-5-methoxybenzoyl)propionate
ethyl 3-carbomethoxy-3-(3-acetoxy-5-methoxybenzoyl)propionate
propyl 3-carbomethoxy-3-(3-propoxybenzoyl)propionate
benzoyl 3-carbomethoxy-3-(2-chloro-5-methoxybenzoyl)propionate
ethyl 3-carbomethoxy-3-(3-benzoyloxybenzoyl)propionate
ethyl 3-carbomethoxy-3-(3-amino-5-benzyloxybenzoyl)propionate
methyl 3-carbomethoxy-3-(3-methoxybenzoyl)butanoate [2]
methyl 3-carbomethoxy-3-(3-methoxybenzoyl)pentanoate [2]
methyl 3-carbomethoxy-3-(3-methoxybenzoyl)hexanoate [2]

EXAMPLE XI

The following compounds are prepared by reaction of corresponding carbalkoxybenzoyl propionates such as the products of Example X with β-bromo or α,β-unsaturated esters employing the procedures and molar proportions of Examples V and VI.

diethyl 3-carbomethoxy-3-benzoyladipate
dimethyl 3-carbethoxy-3-(2-ethyl-5-methoxybenzoyl)adipate
dimethyl 3-carbomethoxy-3-(2-chloro-5-methoxybenzoyl)adipate
dimethyl 3-carbomethoxy-3-(2-dimethylamino-5-methoxybenzoyl)adipate
dibenzyl 3-carbomethoxy-3-(2-acetamindo-5-methoxybenzoyl)adipate
diethyl 3-carbethoxy-3-(3-methoxybenzoyl)adipate
diethyl 3-carbethoxy-3-(3-methyl-5-methoxybenzoyl)adipate
diethyl 3-carbethoxy-3-(3-dimethylamino-5-methoxybenzoyl)adipate
dimethyl 3-carbomethoxy-3-(2,3-dimethylbenzoyl)adipate
diethyl 3-carbethoxy-3-(2-methyl-5-methoxybenzoyl)adipate
diethyl 3-carbethoxy-3-(2,3-dimethyl-5-methoxybenzoyl)adipate
diethyl 3-carbethoxy-3-(3-isopropyl-5-methoxybenzoyl)adipate
diethyl 3-carbethoxy-3-(2,3-diethyl-5-methoxybenzoyl)adipate
diethyl 3-carbethoxy-3-(3-benzyloxybenzoyl)adipate
diethyl 3-carbethoxy-3(3,5-dimethoxybenzoyl)adipate
diethyl 3-carbethoxy-3-(2,3-diethyl-5-ethoxybenzoyl)adipate
diethyl 3-carbethoxy-3-(3-isopropyl-5-ethoxybenzoyl)adipate
dimethyl 3-carbomethoxy-3-(2-methylamino-5-methoxybenzoyl)adipate
dimethyl 3-carbomethoxy-3-(3-ethyl-5-methoxybenzyl)adipate
diethyl 3-carbethoxy-3-(3-methoxy-5-benzyloxybenzoyl)adipate
diethyl 3-carbethoxy-3-(2-propyl-5-propoxybenzoyl)adipate
diethyl 3-carbomethoxy-3-(3-trifluoromethyl-5-methoxybenzoyl)adipate
diethyl 3-carbomethoxy-3-(3-acetoxy-5-methoxybenzoyl)adipate
dipropyl 3-carbomethoxy-3-(3-propoxybenzoyl)adipate
dibenzyl 3-carbomethoxy-3-(2-chloro-5-methoxybenzoyl)adipate
diethyl 3-carbomethoxy-3-(3-benzyloxybenzoyl)adipate
diethyl 3-carbomethoxy-3-(3-amino-5-benzyloxybenzoyl)adipate
diethyl 3-carbomethoxy-3-(3-propyl-5-methoxybenzoyl)adipate
diethyl 3-carbethoxy-3-(2-trifluoromethyl-3,5-dibutoxythoxybenzoyl)adipate
dibenzyl 3-carbethoxy-3-(3-methoxy-5-ethoxybenzoyl)adipate
dibenzyl 3-carbethoxy-3-(2-chloro-3-methyl-5-methoxybenzoyl)adipate
diethyl 3-carbethoxy-3-(2-chloro-3-dimethylamino-5-methoxybenzoyl)adipate
dimethyl 3-carbethoxy-3-(2-chloro-4-acetamidobenzoyl)adipate
dimethyl 3-carbomethoxy-3-(2-chloro-3-acetamido-5-methoxybenzoyl)adipate
dimethyl 3-carbomethoxy-3-(2,3-ditrifluoromethyl-5-methoxybenzoyl)adipate
dimethyl 3-carbomethoxy-3-(2-methyl-3-propionyloxybenzoyl)adipate
diethyl 3-carbethoxy-3-(3-trifluoromethyl-3,5-dibutoxybenzoyl)adipate
diethyl 3-carbethoxy-3-(2-trifluoromethyl-3-ethylamino-5-methoxybenzoyl)adipate
diethyl 3-carbethoxy-3-(3-butyrylamidobenzoyl)adipate
diethyl 3-carbethoxy-3-(2-chloro-3-acetoxy-5-hydroxybenzoyl)adipate
diethyl 3-carbethoxy-3-(2-trifluoromethyl-5-hydroxybenzoyl)adipate
diethyl 3-carbethoxy-3-(2-chloro-3,5-dihydroxybenzoyl)adipate
diethyl 3-carbethoxy-3-(3-acetamido-5-hydroxybenzoyl)adipate
diethyl 3-carbethoxy-3-(3-trifluoromethyl-5-hydroxybenzoyl)adipate.

EXAMPLE XII

Dimethyl 2-(3-methoxybenzoyl)glutarate

*Method A.*—This compound is prepared by employing the methods and molar proportions of Examples V and VI, using methyl (3-methoxybenzoyl)acetate as the starting compound.

---
[2] These compounds are prepared from the appropriate α-benzoyl alkanoates by the procedures of Method A, Example III.

In similar fashion, the following compounds are prepared from corresponding starting compounds using one equivalent of alkylating agent:

diethyl 2-benzoylglutarate
dimethyl 2-(3,5-diethylbenzoyl)glutarate
dimethyl 2-(2-ethyl-5-methoxybenzoyl)glutarate
dimethyl 2-(2-chloro-5-methoxybenzoyl)glutarate
dimethyl 2-(2-dimethylamino-5-methoxybenzoyl) glutarate
dipropyl 2-(2-acetamido-5-methoxybenzoyl)glutarate
dibenzyl 2-(2-acetamido-5-methoxybenzoyl)glutarate
diethyl 2-(3-methyl-5-methoxybenzoyl)glutarate
diethyl 2-(3-dimethylamino-5-methoxybenzoyl)glutarate
dimethyl 2-(2,3-dimethylbenzoyl)glutarate
diethyl 2-(3-methoxybenzoyl)glutarate
diethyl 2-(2-methyl-5-methoxybenzoyl)glutarate
diethyl 2-(4-methyl-5-methoxybenzoyl)glutarate
diethyl 2-(2,3-dimethyl-5-methoxybenzoyl)glutarate
diethyl 2-(3,5-dimethoxybenzoyl)glutarate
diethyl 2-(2,3-diethyl-5-ethoxybenzoyl)glutarate
diethyl 2-(2-isopropyl-5-ethoxybenzoyl)glutarate
dimethyl 2-(2-methylamino-5-methoxybenzoyl)gultarate
dimethyl 2-(3-ethyl-5-methoxybenzoyl)glutarate
diethyl 2-(3-methoxy-5-benzyloxybenzoyl)glutarate
diethyl 2-(2-propyl-5-propoxybenzoyl)glutarate
diethyl 2-(3-trifluoromethyl-5-methoxybenzoyl)glutarate
diethyl 2-(3-acetoxy-5-methoxybenzoyl)glutarate
diporpyl 2-(3-propoxybenzoyl)glutarate
dibenzyl 2-(2-chloro-5-methoxybenzoyl)glutarate
diethyl 2-(3-benzyloxybenzoyl)glutarate
diethyl 2-(3-amino-5-benzyloxybenzoyl)glutarate
diethyl 2-(3-propyl-5-methoxybenzoyl)glutarate
diethyl 2-(2-isopropyl-3-ethyl-5-methoxybenzoyl) glutarate
dibenzyl 2-(3-methoxy-5-ethoxybenzoyl)glutarate
dibenzyl 2-(2-chloro-3-methyl-5-methoxybenzoyl) glutarate
diethyl 2-(2-chloro-3-dimethylamino-5-methoxybenzoyl) glutarate
dimethyl 2-(2-chloro-4-acetamidobenzoyl)glutarate
dimethyl 2-(2-chloro-3-acetamido-5-methoxybenzoyl) glutarate
dimethyl 2-(2,3-ditrifluoromethyl-5-methoxybenzoyl) glutarate
dimethyl 2-(2-methyl-3-propionyloxybenzoyl)glutarate
diethyl 2-(2-trifluoromethyl-3,5-dibutoxybenzoyl) glutarate
diethyl 2-(2-trifluoromethyl-3-ethylamino-5-methoxybenxoyl)glutarate
diethyl 2-(3-butyrylamidobenzoyl)glutarate
diethyl 2-(3-chloro-3-acetoxy-5-ethoxybenzoyl)glutarate
diethyl 2-(2-trifluoromethyl-5-hydroxybenzoyl)glutarate
diethyl 2-(3-acetamido-5-hydroxybenzoyl)glutarate
diethyl 2-(2-chloro-3,5-dihydroxybenzoyl)glutarate
diethyl 2-(3-trifluoromethyl-5-hydroxybenzoyl)glutarate

*Method B.*—A solution of 0.1 mole dimethyl glutarate in dimethylformamide (DMF) is added dropwise to a mixture of 0.1 mole methyl 3-methoxybenzoate and 0.2 mole sodium hydride in DMF. After the addition is complete the mixture is stirred for two hours, slowly acidified with glacial acetic acid, and poured into water. The product is recovered by chloroform extraction, evaporation of the extract, and high-vacuum distillation of the dimethyl 2-(3-methoxybenzoyl)glutarate obtained.

The remaining porducts of method A are also prepared by the present procedure.

EXAMPLE XIII

The compounds of Example XII are converted to the corresponding 3-carbalkoxy-3-benzoyl adipates by reaction with bromoacetic acid ester, employing the procedure and molar proportions of Method A of Example III.

They are also converted to the corresponding 4-benzoyl butyric acids by hydrolysis and decarboxylation according to the procedure of Example VIIIA. These products are in turn converted to the corresponding benzoyl adipates by reaction with bromoacetic acid ester according to the method of Example IIIA.

EXAMPLE XIV

The following compounds are prepared by hydrolysis and decarboxylation of corresponding 3-carbalkoxy compounds according to the procedure of Example VIII.

methyl 3-(3-methoxybenzoyl)butanoate
methyl 3-(3-methoxybenzoyl)pentanoate
methyl 3-(3-methoxybenzoyl)hexanoate
methyl 3-(2-trifluoromethyl-5-methoxybenzoyl)adipate
ethyl 3-(3-trifluoromethyl-5-methoxybenzoyl)adipate
n-propyl 3-(3,5-dimethoxybenzoyl)adipate

EXAMPLE XV

Diethyl 3-(3-methoxybenzoyl)adipate 3-(3-methoxybenzoyl) propionic acid ethyl ester (16.7 g.) is dissolved in 1000 ml. of a 2.5 M solution of methyl magnesium carbonate in methanol and the resulting mixture refluxed for two hours. After cooling, 25 g. of ethyl-β-bromopropionate is added and the mixture allowed to stand for 12 hours, after which it is acidified with concentrated HCl. Chloroform is then added and the entire mixture poured into water. The chloroform layer is separated, dried and concentrated under reduced pressure to give the product, which is vacuum-distilled. Dimethyl-3-(2-chloro-5-methoxybenzoyl)adipate is prepared from corresponding starting compounds in the same way.

Using this procedure, the products of Example XIV are alkylated with corresponding 3-bromo esters or nitriles to provide the following compounds: 4-carbomethoxymethyl-4-(3-methoxybenzoyl)valeronitrile dimethyl-3-(3-methoxybenzoyl)adipate
dimethyl 3-(2-trifluoromethyl-5-methoxybenzoyl)adipate
diethyl 3-(3-trifluoromethyl-5-methoxybenzoyl)adipate
di-n-propyl 3-(3,5-dimethoxybenzoyl)adipate Hydrolysis of these esters provides the corresponding acids.

EXAMPLE XVI

Monoethyl ester of 3-(3-methoxybenzyl)adipic acid

*Method A.*—Five grams of diethyl 3-(3-methoxybenzoyl)adipate and 2 g. of 5% palladium on carbon in 30 ml. of acetic acid are treated in a conventional Parr shaker at a pressure of 40 p.s.i. of hydrogen gas at 50° C. until 2 moles of hydrogen are taken up. The first mole of gas is taken up rapidly and the second more slowly over a total reaction time of up to about 30 hours.

The mixture is filtered, concentrated under reduced pressure to an oil which is vacuum-distilled to obtain the product.

*Method B.*—The γ-lactone of the enol form of the monoethyl ester of the starting compound is hydrogenated over palladium on carbon by this same method to obtain this product. B.T. 190–1° C. (0.3 mm.). Elemental analysis gives the following results:

Calcd. for $C_{16}H_{22}O_5$ (percent): C, 65.29; H, 7.53. Found (percent): C, 65.25; H, 7.68.

The corresponding diethyl ester is prepared by refluxing this product in ethylene dichloride containing ethanol and sulfuric acid. The diester is obtained by diluting the reaction mixture with water, separating, drying and concentrating the ethylene dichloride layer, and vacuum-distilling the residual oil, $n_D^{25} = 1.4973$. Elemental analysis gives the following results:

Calcd. for $C_{18}H_{26}O_5$ (percent): C, 67.06; H, 8.13. Found (percent): C, 67.02; H, 8.31.

The starting compound together with the corresponding γ-lactone are prepared by hydrolysis and decarboxylation of diethyl 3-carbo-t-butoxy-3-(3-methoxybenzoyl)adipate (Example VI) by fluxing in dry xylene containing p-toluenesulfonic acid according to Method B of Example VIII. The products are separated by fractional distillation or may be used together as starting compound for this hydrogenation reaction.

*Method C.*—Five grams of diethyl 3-carbobenzyloxy-3-(m-methoxybenzoyl)adipate and 2 g. of 5% palladium on carbon in 50 ml. of ethanol are treated in a conventional Parr shaker at a pressure of 40 p.s.i. of hydrogen gas at room temperature until one mole of hydrogen is taken up. The reaction flask is then opened and the mixture effervesces with the release of carbon dioxide. Thirty milliliters of acetic acid are then added to the reaction mixture and it is again treated with hydrogen gas at 40 p.s.i. and 50° C. until 2 moles of hydrogen gas are taken up. The product is recovered as in Method A.

EXAMPLE XVII

3-(3-methoxybenzyl)adipic acid

*Method A.*—Amalgamated zinc is prepared by shaking for 5 minutes a mixture of 120 g. of mossy zinc, 12 g. of mercuric chloride, 200 ml. of water and 5 ml. of concentrated HCl in a round-bottomed flask. The solution is decanted and the following reagents added: 75 ml. of water and 175 ml. of concentrated HCl, 100 ml. of toluene and 52 g. of 3-(3-methoxybenzoyl)adipic acid. The reaction mixture is vigorously boiled under reflux for 24 hours. Three 50 ml. portions of concentrated HCl are added at intervals of 6 hours during reflux.

After cooling to room temperature the layers are separated, the aqueous layer diluted with 200 ml. of water and extrated with ether. The ether extract is combined with the toluene layer, dried and concentrated under reduced pressure to obtain the product.

*Method B.*—A solution of 6254.4 g. (22.1 mole) 3-(3-methoxybenzoyl)adipic acid in 38.5 liters of glacial acetic acid is hydrogenated in a 15 gallon stirred autoclave in the presence of 2.5 kg. 5 percent palladium-on-carbon catalyst at 1000 p.s.i.g. and 50° C. until the theoretical amount of hydrogen has been absorbed. The catalyst is filtered off and the solvent removed from the filtrate by distillation at reduced pressure. This gives 5432 g. of product in the form of an oil. It is further purified by conversion to the dimethyl ester, fractional distillation, and hydrolysis, as follows:

A solution of 5432 grams (20.4 mole) of the crude 3-(3-methoxybenzyl)adipic acid, 3410 g. (106.6 mole) methanol, 10.6 liters ethylenedichloride and 106 ml. concentrated sulfuric acid is stirred and refluxed for 15 hours. The mixture is cooled and washed with water (3× 5 l.), 5 percent aqueous sodium hydroxide (1× 2 l.) and again with water (3× 5 l.). The ethylenedichloride solution is dried over 3 lb. anhydrous magnesium sulfate (with 2 lb. Darco G60 activated carbon). The drying agent and carbon are filtered off and the filtrate concentrated at reduced pressure to remove solvent. The residue is distilled through a 3″ x 16″ vacuum-jacketed fractionating column packed with porcelain saddles. After a forerun of 934.1 g. the product is collected at 172.0° C./0.2 mm. to 183° C./0.35 mm. This amounts to 3076.6 g. of 95 percent pure ester.

The ester, 2943.4 g. (10.00 mole) is hydrolyzed by heating over a steam bath for 19 hours with 1 kg. (25.0 mole) sodium hydroxide in 6 liters of water. The hydrolysis mixture is acidified to pH ca. 1.0 by addition of concentrated hydrochloric acid and the product is extracted into methylene chloride (1× 4 l. and 2× 2 l.). The methylene chloride extract is washed with water $$(1 \times 4 \text{ l.} \neq 1 \times 8 \text{ l.})$$

dried over magnesium sulfate, filtered and freed of solvent by dstillation at reduced pressure. This gives 2506 g. of 3-(3-methoxybenzyl)adipic acid in the form of a very sticky oil.

*Method C.*—A solution of dimethyl 3-(3-methoxybenzoyl)adipate (0.01 mole) in 280 ml. of 1:1 tetrahydrofuran:1,2-dimethoxyethane at a temperature of about −10° C. is treated with a solution of sodium borohydride (0.005 mole) in 30 ml. of 1,2-dimethoxyethane and 10 ml. of water. After 15 minutes, 5 ml. of glacial acetic acid is added and the mixture stirred for 5 minutes. Hydrochloric acid (3 ml. of 6 N) is then added, the mixture stirred for an additional 0.5 hour, then poured into water. The product, 3-[α-hydroxy - (3 - methoxybenzyl)]adipic acid dimethyl ester, is recovered by evaporation.

The hydroxy ester is placed in 150 ml. of anhydrous hydrogen fluoride and allowed to stand overnight. The hydrogen fluoride is then evaporated and the thus produced dimethyl 3-(3-methoxy benzylidene)adipate dissolved in dioxane (300 ml.), treated with 0.3 g. of palladium on charcoal (5%) and subjected to 50 p.s.i. hydrogen at room temperature until an equimolar proportion of hydrogen is consumed. The mixture is filtered and the filtrate evaporated to dryness under reduced pressure to give the desired compound as the methyl ester. It is hydrolyzed to the acid by the procedure of Method B.

EXAMPLE XVIII

The following monoester compounds are prepared by reduction of corresponding benzoyl diesters according to the methods of Example XVI. The free adipic acid derivatives are prepared by the methods of Example XVII from the corresponding benzoyl adipic acids. The products are subsequently converted to the corresponding diesters by conventional procedures, e.g. Example XVII, Method B.

3-benzyladipic acid monoethyl ester
3-(2-ethyl-5-hydroxybenzyl)adipic acid monoethyl ester
3-(2-chloro-5-methoxybenzyl)adipic acid monomethyl ester
3-(2-dimethylamino-5-methoxybenzyl)adipic acid monomethyl ester
3-(2-amino-5-methoxybenzyl)adipic acid
3-(2-acetamido-5-methoxybenzyl)adipic acid
3-(3-hydroxy-benzyl)adipic acid monoethyl ester
3-(3-methyl-5-hydroxybenzyl)adipic acid monoethyl ester
3-(2,3-dimethyl-5-hydroxybenzyl)adipic acid monoethyl ester
3-(2-methyl-5-hydroxybenzyl)adipic acid monoethyl ester
3-(3-dimethylamino-5-hydroxybenzyl)adipic acid monoethyl ester
3-(2,3-dimethylbenzyl)adipic acid monomethyl ester
3-(3,5-dimethoxybenzyl)adipic acid monoethyl ester
3-(3-hydroxybenzyl)adipic acid monoethyl ester
3-(3-isopropyl-5-hydroxybenzyl)adipic acid monoethyl ester
3-(2,3-diethyl-5-hydroxybenzyl)adipic acid monoethyl ester
3-(5-benzyloxybenzyl)adipic acid monoethyl ester
3-(2-chloro-5-benzyloxybenzyl)adipic acid monoethyl ester
3-(3-propionyloxybenzyl)adipic acid monoethyl ester
3-(3-acetyloxybenzyl)adipic acid monoethyl ester
3-(2-amino-5-benzyloxybenzyl)adipic acid monobenzyl ester
3-(2-propyl-5-propoxybenzyl)adipic acid monomethyl ester
3-(5-methoxy-2,3-ditrifluoromethylbenzyl)adipic acid monomethyl ester
3-(2-trifluoromethyl-3,5-dibutoxybenzyl)adipic acid monoethyl ester
3-(2-trifluoromethyl-3-ethylamino-5-methoxybenzyl) adipic acid monoethyl ester
3-(3-butyrylamidobenzyl)adipic acid monoethyl ester
3-(2-trifluoromethyl-5-hydroxybenzyl)adipic acid monobenzyl ester
3-(2-chloro-5-hydroxybenzyl)adipic acid monobenzyl ester
3-(2-chloro-3-methyl-5-hydroxybenzyl)adipic acid monoethyl ester
3-(2-chloro-3-isopropyl-5-hydroxybenzyl)adipic acid monoethyl ester 3-(2-chloro-3-amino-5-methoxybenzyl)adipic acid monoethyl ester
3-(2-chloro-3-methyl-5-methoxybenzyl)adipic acid monobenzyl ester
3-(2-chloro-3-ethyl-5-methoxybenzyl)adipic acid monobenzyl ester
3-(2-chloro-3-dimethylamino-5-hydroxybenzyl)adipic acid
3-(3,5-dimethoxybenzyl)adipic acid monoethyl ester
3-(2-methylamino-5-propoxybenzyl)adipic acid monoethyl ester
3-(2-methyl-5-hydroxybenzyl)adipic acid
3-(2-amino-5-benzyloxybenzyl)adipic acid monomethyl ester
3-(3-acetamido-5-hydroxybenzyl)adipic acid monoethyl ester
3-(2-chloro-3,5-dihydroxybenzyl)adipic acid monoethyl ester
3-(3-trifluoromethyl-5-hydroxybenzyl)adipic acid monoethyl ester Diesters are prepared by esterification of these compounds with the selected alcohol by the usual method.

Those compounds having a benzyloxy substituent are reduced by the procedures of Method A or C of Example XVII. Of course, the procedure of Example XVII, Method A, results in hydrolysis of the ester groups and necessitates re-esterification.

EXAMPLE XIX 3-carboalkoxy-3-(benzyl)adipic acid monoalkyl esters

The benzoyl carbonyl group of each of the diester products of Example XI is reduced by the hydrogenolysis procedure of Example XVI, Method A, to produce corresponding benzyl substituted products of Formula I wherein substituents A and B' are each hydrogen, i.e. products of the formula:

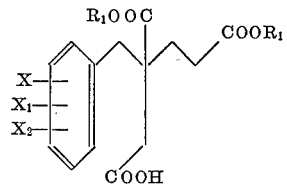

where the substituents have the significance previously ascribed. These products are also esterified to the corresponding triesters by the procedure of Example XVIIB, and hydrolyzed to the corresponding tribasic acids by the procedure given in that same example.

For compounds in which A is hydrogen and B' is hydroxy, the hydrogenation reaction is stopped when one molar equivalent of hydrogen is taken up.

EXAMPLE XX

Diethyl 3-($\alpha$-hydroxy-3-methoxybenzyl)adipate

This product is obtained by treating 5 g. diethyl 3-(3-methoxybenzoyl)adipate and 2 g. 5% palladium on carbon in ethanol with 40 p.s.i. hydrogen gas at room temperature until one molar equivalent of hydrogen is consumed. The reaction mixture is filtered and concentrated at reduced pressure to obtain the product.

Following the same procedure, alpha-hydroxybenzyl adipate compounds corresponding to the products of Example XVIII are prepared by hydrogenation of corresponding benzoyl adipates.

The remaining products of Example XV are also reduced to the corresponding alpha-hydroxy derivatives by these methods.

EXAMPLE XXI

Diethyl 3-($\alpha$-dimethylamino-3-methoxybenzyl)adipate

Diethyl 3-($\alpha$-hydroxy-3-methoxybenzyl)adipate, 0.01 mole in 15 ml. dimethoxyethane, is added to a stirred mixture of 1.9 g. (0.01 mole) p-toluenesulfonyl chloride and 2.5 ml. dry pyridine in an ice bath. When the reaction subsides the mixture is permitted to warm to room temperature, stirred for three hours, and poured into 50 ml. water. The pH is adjusted to 5 and the resulting tosyl ester recovered by filtration.

The tosylate (0.0025 mole) is combined with 25 ml. dimethoxyethane and added dropwise to a stirred solution of 0.015 mole dimethylamine in 50 ml. dimethoxyethane at 0° C. After addition is complete, stirring is continued for an hour at 0° and the reaction mixture is then heated at 60° for three hours under a Dry Ice condenser. The mixture is next evaporated in vacuo and the residue washed with water to remove dimethylammonium toluenesulfonate. The product is recovered by filtration from the water.

Substitution of monomethylamine for dimethylamine in this procedure provides the corresponding $\alpha$-N-methylamino derivative. The latter tends to form the corresponding lactam, and is converted to the 3-[$\alpha$-(N-methylacetamido)-3-methoxybenzyl]adipate in the following way:

The amino compound is placed in 20 parts water containing one molar equivalent of HCl, and 2.2 molar equivalents of acetic anhydride are added. Sufficient sodium acetate is then added to neutralize the HCl and the solution is warmed to 50° C. After 5 minutes the mixture is cooled and the product separated by filtration.

EXAMPLE XXII

Following the procedures of Example XXI, $\alpha$-hydroxybenzyl adipates including those of Examples XIX and XX are converted via the tosylates to the following products:

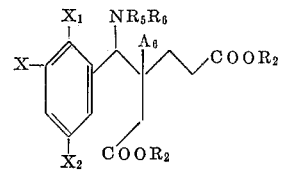

| X | $X_1$ | $X_2$ | $R_2$ | $A_6$ | $R_5$ | $R_6$ |
|---|---|---|---|---|---|---|
| H | H | H | Et | $CO_2Me$ | Me | Me |
| H | Et | OMe | Me | $CO_2Me$ | Et | Ac |
| H | $NMe_2$ | OMe | Me | $CO_2Me$ | Me | Me |
| H | $NH_2$ | OMe | Bz | $CO_2Bg$ | H | Ac |
| H | NHAc | OMe | Bz | $CO_2Me$ | Me | Me |
| Me | Cl | OH | Me | $CO_2Pr$ | Me | Me |
| i-Pr | Cl | OH | Et | $CO_2Bz$ | Me | Ac |
| Et | Et | OH | Et | $CO_2Et$ | H | Ac |
| H | Cl | OBz | Et | $CO_2Me$ | Me | Me |
| H | Cl | OH | Et | $CO_2Et$ | Et | Et |
| $NH_2$ | Cl | OMe | Me | $CO_2Bu$ | H | Ac |
| Et | Cl | OMe | Me | $CO_2Me$ | Me | Ac |
| Me | Cl | OMe | Et | $CO_2Me$ | Me | Me |
| $NMe_2$ | Cl | OH | Et | $CO_2Et$ | Me | Me |
| Me | Me | H | Me | $CO_2Et$ | Me | Me |
| H | Cl | OH | Me | $CO_2Me$ | Et | Et |
| H | Cl | OMe | Me | $CO_2Pr$ | Me | Me |
| OMe | H | OMe | Me | H | Me | Me |
| OMe | H | OMe | Et | $CO_2Et$ | Me | Me |
| H | NHAc | OMe | Et | $CO_2Et$ | Me | Me |
| H | NHAc | OBz | Me | $CO_2Me$ | Pr | Pr |
| OMe | H | H | Me | $CO_2Me$ | Me | Me |
| OMe | H | H | Me | H | Me | Me |
| H | OMe | H | Me | $CO_2Me$ | Et | Et |
| Me | H | OMe | Et | $CO_2Et$ | Me | Me |
| NHAc | H | OMe | Et | H | Me | Me |
| OMe | H | H | Me | Et | Et | Et |
| Me | Me | H | Me | $CO_2Me$ | Me | Me |
| Et | Cl | OMe | Bz | H | Me | $\overset{O}{\overset{\|}{C}}$-Et |
| $NMe_2$ | Cl | OH | Et | H | H | Ac |
| H | Me | OMe | Et | H | Me | Me |
| H | Cl | OMe | Bz | $CO_2Me$ | H | Ac |
| H | Cl | OMe | Me | $CO_2Me$ | H | Ac |
| H | Me | OH | Me | H | Me | Me |
| Me | Me | OH | Me | $CO_2Me$ | Me | Me |
| H | Cl | OH | Et | $CO_2Me$ | Me | Me |
| H | Me | OMe | Et | $CO_2Bz$ | Me | Ac |
| Me | Cl | OMe | Bz | $CO_2Et$ | Me | Ac |
| OMe | H | OMe | Et | $CO_2Et$ | Me | Me |
| H | Cl | OH | Me | $CO_2Me$ | Me | Ac |
| i-Pr | H | OH | Et | $CO_2Et$ | Me | Me |
| H | $NH_2$ | OBz | Me | $CO_2Et$ | Me | Me |
| H | Pr | OPr | Et | $CO_2Et$ | H | Ac |
| H | H | OH | Me | $CO_2Me$ | H | Ac |
| H | H | OMe | Me | $CO_2Me$ | Me | Ac |
| H | H | OMe | Me | $CO_2Me$ | Me | Me |

| X | X₁ | X₂ | R₂ | A₆ | R₅ | R₆ |
|---|---|---|---|---|---|---|
| H | H | OMe | Et | CO₂Et | Et | Et |
| H | H | OMe | Et | CO₂Et | Et | Ac |
| H | H | OH | Pr | CO₂Pr | H | Ac |
| H | H | OH | Et | CO₂Et | Me | Ac |
| H | H | OH | Me | CO₂Bu | E | Et |
| OCOMe | Cl | OEt | Et | CO₂Et | He | Ac |
| CF₃ | CF₃ | OMe | Me | Me | Me | Me |
| OBu | CF₃ | OBu | Et | CO₂Et | Mt | Me |
| NHEt | CF₃ | OMe | Et | Et | Ee | Et |
| NHCOPr | H | H | Et | CO₂Et | Me | Me |
| H | CF₃ | OH | Et | CO₂Me | Me | Me |
| OH | Cl | OH | Et | CO₂Et | Me | Me |
| NHAc | H | OH | Me | H | Me | Me |
| CF₃ | H | OH | Et | CO₂Et | Mt | Me |
| OH | H | H | Et | CO₂Et | Et | Et |
| H | H | OBz | Et | CO₂Et | Ee | Et |
| NH₂ | H | OMe | Me | H | Me | Me |
| Pr | N | OMe | Et | CO₂Me | Me | Me |
| Me | H | OMe | Bu | Me | Me | Me |
| NMe₂ | H | OH | Et | CO₂Et | Mt | Me |
| H | CF₃ | H | Et | CO₂Et | E | Et |
| Et | H | OMe | Me | CO₂Me | H | Ac |
| OMe | Cl | H | Me | CO₂Me | H | Ac |
| NHAc | Cl | OMe | Me | CO₂Me | H | Ac |
| H | CF₃ | H | Me | CO₂Et | H | Ac |
| H | CF₃ | OMe | Pr | CO₂Me | Me | Me |
| H | H | OEt | Me | CO₂Me | Me | Me |
| H | Me | OMe | Et | CO₂Et | Me | Me |
| H | Cl | OCOEt | Me | H | H | Ac |
| H | Cl | OCOMe | Et | H | Et | Et |
| i-Pr | H | OMe | Et | CO₂Et | Me | Me |
| OCOMe | H | H | Me | H | Me | Me |
| OCOEt | H | H | Me | H | Me | Me |
| OBz | H | H | Et | CO₂Me | Me | Me |
| Me | H | OH | Me, | H | Me | Me |
| H | Cl | OBz | Et | CO₂Me | H | Ac |
| NHMe | H | OPr | Et | H | Me | Me |
| OBz | H | H | Me | CO₂Et | Me | Me |
| NHAc | H | H | Et | CO₂Et | Me | Me |
| Et | Et | H | Et | CO₂Et | Me | Me |
| H | NHMe | OMe | Me | CO₂Me | Me | Me |
| OMe | H | OBz | Et | CO₂Et | Me | Me |
| OCOMe | H | OMe | Et | CO₂Me | H | Ac |
| Et | i-Pr | OMe | Et | CO₂Me | Me | Me |
| Me | H | OPr | Me | CO₂Me | Me | Me |
| H | Cl | OH | Bz | CO₂Bz | Me | Me |
| Me | Cl | OH | Et | CO₂Et | Me | Me |
| Et | Et | OH | Et | H | Me | Me |
| H | Cl | OBz | Et | H | Me | Me |
| H | Cl | OCOEt | Et | H | Me | Me |
| H | Cl | OBz | Bz | H | Me | Me |
| H | Cl | OPr | Et | H | Et | Et |
| H | Cl | OH | Pr | H | Et | Et |
| H | Cl | OMe | Et | H | Me | Et |
| NH₂ | Cl | OMe | Et | H | Me | Ac |
| Pr | H | OMe | Me | Me | Me | Me |

NOTE.—Me=methyl; Et=ethyl; Pr=propyl; Bu=butyl; Bz=benzyl; Ac=acetyl.

EXAMPLE XXIII

Dimethyl 3-(α-methoxymethylene-2-chloro-5-methoxybenzyl)adipate

The ylid is prepared from chloromethyl ether in the following manner: triphenylphosphine (52.4 g., 0.2 mole) is dissolved in 100 ml. anhydrous benzene and 16.1 g. chloromethyl ether added. The mixture is heated at 50° C. for 16 hours. The resulting heavy crystalline mass is filtered off; washed with ether, dissolved in chloroform, and re-precipitated with ethyl acetate. The precipitate is then separated, washed with ether, and dried at 80° C. in high vacuum.

Triphenylmethoxymethylphosphonium chloride, 6.84 g., 0.02 mole, prepared as described above, is suspended in 65 ml. absolute ether. To this suspension is added 19.6 ml. 1.0 N phenyl lithium solution. With slight warming the mixture turns orange-red and then dark red. After five minutes there is added portionwise 0.02 mole dimethyl 3-(2-chloro-5-methoxybenzoyl)adipate in 50 ml. ether. An exothermic reaction occurs causing the ether to reflux. After stirring for 2 hours, the suspension is filtered and the separated solids washed with ether. The combined ether filtrate and washings are dried over anhydrous sodium sulfate, filtered, and evaporated, to obtain dimethyl 3 - (α - methoxymethylene - 2-chloro-5-methoxybenzyl)-adipate as residue. It is further purified by distillation under high vacuum.

In the same way the following compounds are prepared from the corresponding reactants:

diethyl-3-(α-methoxymethylene-3-methoxybenzyl)adipate
dimethyl-3-(α-ethoxymethylene-3,5-dimethoxybenzyl)-adipate
diethyl-3-[α-(1-methoxyethylidene)-3-(benzoyloxy)-benzyl]adipate

EXAMPLE XXIV

Following the procedure described in Example XXIII, the following additional products are prepared from the corresponding benzoyl adipates. (For these syntheses the necessary chloromethyl ethers of the formula $$R_4CH(OR_8)_2$$

with acetyl chloride, as described in Liebig's Annalen, 493, p. 203, and 498, p. 120 (1932).

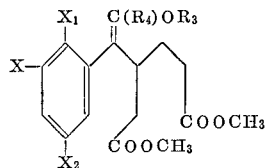

| X | X₁ | X₂ | R₄ | R₃ |
|---|---|---|---|---|
| H | Cl | OH | CH₃ | CH₃ |
| H | NHAc | OEt | H | CH₃ |
| Me | H | OMe | H | n-C₃H₇ |
| OMe | H | OMe | H | CH₃ |
| H | Cl | OMe | H | CH₃ |
| Me | Cl | OH | C₅H₁₁ | H |
| H | H | OMe | H | CH₃ |
| H | Cl | OMe | C₂H₅ | C₂H₅ |
| CF₃ | H | H | H | CH₃ |
| NHAc | Cl | OH | CH₃ | CH₃ |
| Me | H | OMe | CH₃ | CH₃ |
| CF₃ | Cl | OH | H | CH₃ |
| H | Cl | OMe | C₂H₅ | CH₃ |
| H | Cl | OMe | H | CH₃ |
| CF | Cl | H | H | CH₃ |

Corresponding products of Structure X are prepared by this procedure, employing the benzyl adipates of Structure II produced in Examples 5, 6, 8, 11, 13 and 15.

EXAMPLE XXV

Dimethyl 2-(α-methoxymethyl-2-chloro-5-methoxybenzyl)adipate

The title product of Example XXIII is dissolved in 50 parts by weight dioxane and hydrogenated over 0.1 part 5% palladium on charcoal at 50 p.s.i. and room temperature until one molar proportion of hydrogen has been absorbed. The hydrogenation mixture is filtered, and the filtrate evaporated to otbain the desired product as residue. It is further purified by high-vacuum distillation.

EXAMPLE XXVI

The procedure of Example XXV is applied to the remaining products of Example XXIII and those of Example XXIV to produce corresponding alpha (1-alkoxyalkyl) benzyl adipates of the formula:

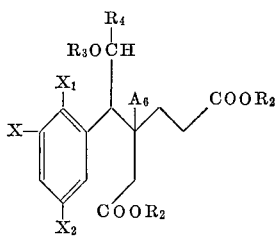

including such compounds as diethyl-3-(α-ethoxymethyl-3-methoxy-5-methylbenzyl)adipate.

Any benzyloxy groups present are concurrently hydrogenolyzed, with the consumption of an additional molar proporation of hydrogen.

EXAMPLE XXVII

Dimethyl 3-(α-hydroxymethyl-3-trifluoromethylbenzyl)-adipate

Dimethyl 3 - (α-methoxymethyl-3-trifluoromethylbenzyl)adipate, prepared as in Example XXV, 0.01 mole, is combined with 100 ml. 48% HBr, heated for 10 minutes at 100° C., and concentrated under reduced pressure. The residue is combined with 0.022 mole sodium hydroxide in 50 ml. water and heated to 60° C. Dimethyl sulfate, 0.025 mole, is now added, and the mixture is heated at 100° C. until slightly acidic. At this time 0.005 mole hydroxide is added, followed by 0.006 mole dimethyl sulfate, and heating at 100° C. is continued until the mixture again becomes slightly acidic (with introduction of additional dimethyl sulfate if necessary). After cooling, the reaction mixture is extracted with chloroform, and the extract is washed with aqueous sodium carbonate followed by brine. The chloroform is then dried and evaporated to obtain the product.

In the same way, the alpha (1-alkoxyalkyl)benzyl adipates of Example XXVI are converted to corresponding 1-hydroxyalkyl derivatives, with concurrent cleavage of any other ether groups present.

EXAMPLE XXVIII

Dimethyl 3-(α-formyl-2-chloro-5-methoxybenzyl)-adipate

Dimethyl 3-(α-methoxymethylene-2-chloro-5-methoxybenzyl)adipate prepared as described in Example XXIII is warmed with a mixture of 1:10 by volume 1% aqueous hydrochloric acid:dioxane for 5 minutes at 60° C. The solvent is then removed by evaporation at reduced pressure, and the residue is converted to the bisulfite addition product by shaking with alcoholic sodium bisulfite as described in Vogel, "A Textbook of Practical Organic Chemistry," Longmans (1948), p. 330. The addition product is then hydrolyzed by treatment with 5% aqueous hydrochloric acid and the resulting dimethyl 3-(α-formyl-2-chloro-5-methoxybenzyl)adipate is extracted from the aqueous acid into chloroform and recovered by evaporation of the solvent.

In the same way the alkoxy methylene products of Examples XXIII and XXIV are converted to the corresponding α-formyl derivatives of Structure XII.

EXAMPLE XXIX

Dimethyl 3-(α-hydroxymethyl-2-chloro-5-methoxy-benzyl)adipate

The title product of Example XXVIII is hydrogenated in ethylene glycol dimethyl ether solvent at room temperature over platinum oxide catalyst until an equimolar proportion of hydrogen is consumed. The catalyst is then separated by filtration and the product recovered by evaporation of the solvent under reduced pressure. The other α-formyl derivatives of the preceding example are also converted to the corresponding α-hydroxymethyl derivatives by this procedure, observing the precautions of Example XXVI.

These products are converted in turn to α-methoxy-methyl benzyl adipates by treatment with two equivalents of diazomethane in methylene chloride solution for 24 hours at room temperature in the presence of 0.6–0.8 mole percent fluoroboric acid (the method of Roberts, et al., J. Am. Chem. Soc., Vol. 80, p. 2584, 1958). The products are recovered by washing with water and evaporating the methylene chloride at reduced pressure. Any acid groups present in the molecule are concurrently esterified, and hydroxyl groups are etherified; the diazomethane introduced is increased proportionately in these cases.

EXAMPLE XXX 1-ethoxymethyl-2-(2-carbethoxyethyl)-5-methoxy-8-chloro-4-tetralone

A mixture of 2 g. of 3-(α-ethoxymethylchloro-5-methoxybenzyl)-adipic acid monoethyl ester in 25 ml. liquid hydrogen fluoride is allowed to stand overnight at room temperature. The reaction mixture is then permitted to evaporate, leaving the desired product as residue. Purification is effected by recrystallization from aqueous alcohol.

The corresponding 2-(α-carboxyethyl) derivative is obtained by the same procedure, substituting the dibasic acid for the monoester starting compound. This product is converted to the ethyl ester by conventional esterification.

EXAMPLE XXXI 1-(1-methoxyethyl)-2-(2-carbethoxyethyl)-5-methoxy-8-methyl-4-tetralone A mixture of diethyl 3-[α-(1-methoxyethyl)-2-methyl-5-methoxybenzyl] adipate, 2 g., and 30 g. polyphosphoric acid is heated on a steam bath for 30 minutes and then poured into ice water. The product separates from the water and is recovered.

EXAMPLE XXXII 1-hydroxymethyl-2-(2-carbomethoxyethyl)-5-hydroxy 8-chloro-4-tetralone This product is prepared from 1-methoxymethyl-2-(2-carbomethoxyethyl)-5-methoxy-8-chloro-4 - tetralone as described in Example XXVII.

EXAMPLE XXXIII 1-methoxymethyl-2-(2-carbomethoxyethyl)-5-methoxy-4-tetralone 1-methoxymethyl-2-(carbomethoxyethyl) - 5 - methoxy-8-chloro-4-tetralone, 1.5 g., is combined with 5% palladium on charcoal, 0.4 g., triethylamine, 0.5 g. and methanol, 270 ml., in a hydrogenation bottle and subjected to 50 pounds hydrogen pressure until one molar proportion of hydrogen has been consumed. The reaction mixture is filtered and the filtrate evaporated to dryness. The resulting residue is freed of triethylamine hydrochloride by water washing.

EXAMPLE XXXIV 1-methoxymethyl-2-(2-carbomethoxyethyl)-5-methoxy-8-nitro-4-tetralone One gram of the product of the preceding example is slowly added to 10 ml. concentrated sulfuric acid containing 2 ml. 70% nitric acid at 0–5° C. The solution is stirred for 15 minutes and then allowed to warm to room temperature and poured into a mixture of ice and water. The product is recovered by chloroform extraction and evaporation of the extract.

EXAMPLE XXXV 1-formyl-2-(2-carboxyethyl)-5-methoxy-8-methyl-4-tetralone

Diethyl 3-(α-formyl-2-methyl - 5 - methoxybenzyl) adipate is converted to the acetal by refluxing in benzene solution with ethanol in the presence of 1% p-toluenesulfonic acid. The condensed vapors are returned to a Dean-Stark tube, with separation of water before the organic layer drains back to the reaction mixture. When a mole of water has been collected per mole of formyl adipate the reaction mixture is cooled and neutralized with aqueous sodium hydroxide, and the benzene and excess ethanol are evaporated under vacuum. The acetal residue is converted to the corresponding tetralone by the procedure of Example XXXI. The resulting acetal is converted to 1-formyl-2-(2-carbethoxyethyl)-5-methoxy-8-methyl-4-tetralone by refluxing for 20 minutes in 1 N aqueous hydrochloric acid. The correspondng 2-carboxyethyl derivative is obtained by prolonging the acid reflux until the ester group has also hydrolyzed.

In the same fashion, other formyl tetralones are prepared, including 1-formyl-2-(2 - carbethoxyethyl)-7-trifluoromethyl-8-chloro-4-tetralone, from the compounds of Example XXVIII.

EXAMPLE XXXVI 1-hydroxymethyl-2-(2-carboxyethyl)-5-methoxy-8-methyl-4-tetralone This product is prepared by treating the title product of the preceding example with 1.2 equivalents of sodium borohydride according to the procedure of Example XVIII. It is converted to 1-methoxymethyl-2-(2-carbomethoxyethyl)-5-methoxy-8-methyl-4-tetralone by diazomethane treatment as in Example XXIX.

EXAMPLE XXXVII 2-carboxy-3-(2-carboxyethyl)-5-methoxy-7-acetamido-4-tetralone 3-carboxy-3-(3-acetamido-5-methoxybenzyl)adipic acid, 1 mole, is placed in a polyethylene container in an ice bath, and 1.2 mole liquid hydrogen fluoride is introduced from an inverted, chilled tank. The mixture is swirled to make homogeneous and then left to evaporate partially overnight in a hood. The hydrogen fluoride that remains is removed by evaporation to obtain the product as residue.

Following the same procedure the 3-carboxy-, 3-carboalkoxy- and 3-carbobenzyloxy benzyl adipic acids, and the corresponding monoalkyl and monobenzyl adipates, prepared as described in Example XIX, are converted to the corresponding tetralones, to provide products such as 2-carbethoxy-2-(2-carbethoxyethyl)-5-methoxy-4-tetralone.

EXAMPLE XXXVIII 1-dimethylamino-2-(2-carboxyethyl)-5-hydroxy-4-tetralone

This product is prepared by treatment of 3-(α-dimethylamino-3-hydroxybenzyl)adipic acid with hydrogen fluoride as in the preceding example. In the same way, the 3-(α-aminobenzyl)adipic acids of Example XX are converted to the corresponding tetralones. Those tetralones having free α-amino or α-monoalkylamino groups are acylated with lower alkanoic acid anhydrides by the procedure of Example XXI to form the corresponding α-alkanoamido tetralones. The products prepared include 1-acetamido-2-(2-carboxyethyl)-4-tetralone and 1-(N-methylacetamido)-2-(2-carbomethoxyethyl)-5,7-dimethoxy-4-tetralone.

EXAMPLE XXXIX

The adipates of Examples XIX, XX, XXV, XXVI and XXVIII are converted to tetralones of the following formula by the procedures of Examples XXX–XXXVIII. The procedure of Example XXXI is avoided where amino or hydroxy substituents are present. By these methods the following products are prepared:

| X | X₁ | X₂ | R₂ | A₁ | B |
|---|---|---|---|---|---|
| H | Cl | OMe | Pr | COOH | CHO |
| H | NMe₂ | OMe | Et | H | CHO |
| H | Et | OMe | Et | H | CHO |
| H | NH₂ | OMe | Bz | H | CHO |
| H | NHAc | OMe | Pr | H | CHO |
| H | Cl | OMe | Me | H | CHO |
| H | NHAc | OEt | Me | H | CHO |
| Me | H | OMe | Me | H | CHO |
| OMe | H | OMe | Me | H | CHO |
| H | H | OMe | Me | H | CHO |
| CF₃ | H | H | Me | H | CHO |
| CF₃ | H | OH | Me | H | CHO |
| H | Cl | OH | Me | H | CH(CH₃)OMe |
| H | NHAc | OEt | Me | H | CH₂OMe |
| Me | H | OMe | Me | H | CH₂OPr |
| OMe | H | OMe | Me | H | CH₂OMe |
| H | Cl | OMe | Me | H | CH(C₅H₁₁)OH |
| Me | Cl | OH | Me | H | CH₂OMe |
| H | H | OMe | Me | H | CH(C₂H₅)OEt |
| H | Cl | OMe | Me | H | CH₂OMe |
| CF₃ | H | H | Me | H | CH(CH₃)OMe |
| NHAc | Cl | OH | Me | H | CH(CH₃)OMe |
| Me | H | OH | Me | H | CH₂OMe |
| CF₃ | Cl | OH | Me | H | CH₂OMe |
| H | Cl | OMe | Me | H | CH₂OMe |
| Me | H | OMe | Et | H | CH₂OEt |
| CF₃ | H | H | Me | H | CH₂OH |
| H | Cl | OH | Me | H | CH(CH₃)OH |
| H | NHAc | OEt | Me | H | CH₂OH |
| Me | H | OMe | Me | H | CH₂OH |
| OMe | H | OMe | Me | H | CH₂OH |
| H | Cl | OMe | Me | H | CH₂OH |

| X | X₁ | X₂ | R₂ | A₁ | B |
|---|---|---|---|---|---|
| Me | H | OMe | Et | H | CH₂OH |
| H | H | OMe | Me | H | CH₂OH |
| H | Cl | OMe | Me | H | CH(C₂H₅)OH |
| CF₃ | H | H | Me | H | CH₂OH |
| NHAc | Cl | OH | Me | H | CH(CH₃)OH |
| Me | H | OMe | Me | H | CH(CH₃)OH |
| CF₃ | H | OH | Me | H | CH₂OH |
| H | Cl | OMe | Me | H | CH₂OH |
| H | NO₂ | OMe | Me | H | CH₂OH |
| Me | Cl | OBz | Bz | H | NMe₂ |
| H | Cl | OMe | Et | CO₂Me | CH(CH₃)OH |
| H | Cl | OH | Et | H | CH₂OMe |
| Me | Cl | OCOEt | Et | H | NEt₂ |
| H | Cl | OCOMe | Et | H | MeNEt |
| NH₂ | Cl | OMe | Bz | H | NPr₂ |
| Et | Cl | OMe | Bz | H | MeNCOEt |
| NMe₂ | Cl | OH | Et | H | NHAc |
| H | Cl | OH | Pr | H | NEt₂ |
| H | Cl | OMe | Et | H | MeNEt |
| H | H | OMe | Et | H | MeNAc |
| Me | Cl | OMe | Et | CO₂H | NMe₂ |
| Pr | H | OMe | Me | Me | CH₂OEt |
| NMe₂ | H | OMe | Me | Pr | CH₂OEt |
| H | Cl | OBz | Bz | H | NMe₂ |
| H | Cl | OPr | Et | H | NEt₂ |
| H | NH₂ | OBz | Me | CO₂H | NMe₂ |
| H | Pr | OPr | Et | CO₂H | NHAc |
| H | H | OH | Me | CO₂H | NHAc |
| CF₃ | CF₃ | OMe | Me | Me | NMe₂ |
| OMe | Cl | H | Me | CO₂H | NHAc |
| H | CF₃ | OMe | Pr | CO₂H | NMe₂ |
| H | Me | OMe | Et | CO₂H | NMe₂ |
| NMe₂ | H | OH | Et | CO₂H | NMe₂ |
| OMe | H | OMe | Me | H | NMe₂ |
| Et | Et | OH | Et | H | NMe₂ |
| NHMe | H | OPr | Et | H | NMe₂ |
| OCOMe | H | OMe | Et | CO₂H | NHAc |
| OBz | H | H | Et | CO₂H | NMe₂ |
| H | Cl | OH | Et | CO₂Bz | H |
| H | H | H | Et | CO₂Et | H |
| Me | Cl | OH | Et | CO₂Et | H |
| i-Pr | Cl | OH | Et | CO₂H | H |
| H | Cl | OH | Pr | CO₂H | H |
| H | Cl | OH | Bu | CO₂H | H |
| H | Et | OMe | Me | H | H |
| H | NMe₂ | OMe | Et | H | CH₂OMe |
| H | NHAc | OMe | Me | H | CH₂OMe |
| NHAc | H | OMe | Pr | CO₂Pr | CH₂OMe |
| H | H | OBz | Et | H | NMe₂ |
| H | Me | OMe | Et | H | NMe₂ |
| Me | H | OMe | Me | EtCH₂ | CHOEt |
| H | H | H | Et | H | NMe₂ |
| i-Pr | H | OMe | Me | H | CH(CH₃)OMe |
| H | H | H | Et | CO₂Me | H |
| H | Et | OMe | Me | CO₂Me | H |
| H | NMe₂ | OMe | Me | CO₂Me | H |
| H | NH₂ | OMe | Bz | CO₂Bz | H |
| H | NHAc | OMe | Bz | CO₂Me | H |
| Me | Cl | OH | Me | CO₂Pr | H |
| i-Pr | Cl | OH | Et | CO₂Bz | H |
| Et | Et | OH | Et | CO₂Et | H |
| H | Cl | OBz | Et | CO₂Me | H |
| H | Cl | OH | Et | CO₂Et | H |
| H | NH₂ | OMe | Me | CO₂Bu | H |
| NH₂ | Cl | OMe | Me | CO₂Me | H |
| Et | Cl | OMe | Et | CO₂Me | H |
| Me | Cl | OH | Et | CO₂Et | H |
| NMe₂ | Me | H | Me | CO₂Et | H |
| Me | Cl | OH | Me | CO₂Me | H |
| H | Cl | OMe | Me | CO₂Pr | H |
| OMe | H | OMe | Et | H | H |
| OMe | H | OMe | Et | H | H |
| H | NHAc | OMe | Et | H | H |
| H | NHAc | OMe | Et | H | H |
| OMe | H | H | Et | CO₂Et | H |
| OMe | H | H | Et | CO₂Et | H |
| H | H | OBz | Me | CO₂Me | H |
| H | H | H | Me | CO₂Me | H |
| H | H | H | Me | H | H |
| OMe | H | H | Me | CO₂Me | H |
| Me | H | OMe | Et | CO₂Et | H |
| NHAc | H | OMe | Et | H | H |
| OMe | H | H | Me | Et | H |
| Me | H | H | Me | CO₂Me | H |
| Et | Cl | OMe | Bz | H | H |
| H | Cl | OMe | Bz | CO₂Me | H |
| H | Me | OH | Me | H | H |
| Me | Me | OH | Me | CO₂Me | H |
| H | Cl | OH | Et | CO₂Me | H |
| H | Me | OMe | Et | CO₂Bz | H |
| Me | Cl | OMe | Bz | CO₂Et | H |
| Me | Cl | OMe | Et | CO₂Et | H |
| OMe | H | OMe | Me | CO₂Me | H |
| H | Cl | OH | Et | CO₂Et | H |
| i-Pr | H | OH | Me | CO₂Et | H |
| H | NH₂ | OBz | Me | CO₂Et | H |
| H | Pr | OPr | Et | CO₂Et | H |
| H | H | OH | Me | CO₂Me | H |
| H | H | OMe | Me | CO₂Me | H |
| H | H | OMe | Et | CO₂Et | H |
| H | H | OMe | Et | CO₂Et | H |
| H | H | OH | Pr | CO₂Pr | H |
| H | H | OH | Et | CO₂Et | H |
| H | H | OH | Me | CO₂Bu | H |
| OCOMe | C | OEt | Et | CO₂Et | H |
| CF₃ | CF₃ | OMe | Me | Me | H |

| X | X₁ | X₂ | R₂ | A₁ | B |
|---|----|----|----|----|---|
| OBu | CF₃ | OBu | Et | CO₂Et | H |
| NHEt | CF₃ | OMe | Et | Et | H |
| NHCOPr | H | H | Et | CO₂Et | H |
| H | CF₃ | OH | Et | CO₂Me | H |
| OH | Cl | OH | Et | CO₂Et | H |
| NHAc | H | OH | Me | H | H |
| CF₃ | H | OH | Et | CO₂Et | H |
| OH | H | H | Et | CO₂Et | H |
| H | H | OBz | Et | CO₂Et | H |
| NH₂ | H | OMe | Me | H | H |
| Pr | H | OMe | Et | CO₂Me | H |
| Me | H | OMe | Bu | H | H |
| NMe₂ | H | OH | Et | CO₂Et | H |
| H | CF₃ | H | Et | CO₂Et | H |
| Et | H | OMe | Me | CO₂Me | H |
| OMe | Cl | H | Me | CO₂Me | H |
| NHAc | Cl | OMe | Me | CO₂Me | H |
| H | CF₃ | H | Me | CO₂Et | H |
| H | CF₃ | OMe | Pr | CO₂Me | H |
| H | H | OEt | Me | CO₂Me | H |
| H | Me | OMe | Et | CO₂Et | H |
| H | Cl | OCOEt | Me | H | H |
| H | Cl | OCOMe | Et | H | H |
| i-Pr | H | OMe | Et | CO₂Et | H |
| OCOMe | H | H | Me | H | H |
| OCOEt | H | H | Me | H | H |
| OBz | H | H | Et | CO₂Me | H |
| Me | H | OH | Me | H | H |
| H | Cl | OBz | Et | CO₂Me | H |
| NHMe | H | OPr | Et | H | H |
| OBz | H | H | Me | CO₂Et | H |
| NHAc | H | H | Et | CO₂Et | H |
| Et | Et | H | Et | CO₂Et | H |
| H | NHMe | OMe | Me | CO₂Me | H |
| OMe | H | OBz | Et | CO₂Et | H |
| OCOMe | H | OMe | Et | CO₂Me | H |
| Et | i-Pr | OMe | Et | CO₂Me | H |
| Me | H | OPr | Me | CO₂Me | H |
| H | Cl | OH | Bz | CO₂Bz | H |
| Me | Cl | OH | Et | CO₂Et | H |
| Et | Et | OH | Et | H | H |
| H | Cl | OBz | Et | H | H |
| H | Cl | OCOEt | Et | H | H |
| H | Cl | OBz | Bz | H | H |
| H | Cl | OPr | Et | H | H |
| H | Cl | OH | Pr | H | H |
| H | Cl | OMe | Et | H | H |
| NH₂ | Cl | OMe | Et | H | H |
| NMe₂ | Cl | OH | Et | H | H |
| Pr | H | OMe | Me | Me | H |

EXAMPLE XL 2-carbomethoxy-5,7-dimethoxy-9-methoxymethyl-3,4,10-trioxo-1,2,3,4,4a,9,9a,10-octahydroanthracene 0.1 mole of 1 - methoxymethyl - 2 - (2-carbomethoxyethyl)-5,7-dimethoxy-4-tetralone is dissolved together with 24 grams dimethyl oxalate (0.2 mole) by warming with 135 ml. freshly distilled dimethyl formamide in a well dried two liter flask which has been flushed with dry nitrogen. The solution is cooled at 20° C. and to it is added all at one time 0.4 mole sodium hydride in the form of a 50% oil dispersion which has been exposed to the atmosphere for 24 hours in order to produce a deactivating coating. The reaction mixture is maintained at 20–25° C. with an ice bath. 0.1 mole dry methanol is now added, and when the temperature begins to fall, the reaction vessel is removed from the ice bath and quickly placed in an oil bath at 110° C. The reaction temperature is brought with dispatch to 90° C. and maintained there for 10 minutes, or until active bubbling ceases if this occurs sooner.

The reaction mixture is now chilled to 15° C. and carefully acidified with glacial acetic acid. The dimethyl formamide and excess acetic acid are then removed in vacuo and the residue partitioned between water and chloroform. The aqueous phase is re-extracted with chloroform, the combined chloroform extracts treated with activated carbon, dried, and filtered. The chloroform solution is chromatographed on silicic acid or acid-washed Florisil. The highly fluorescent product fraction is collected and evaporated to obtain the desired substance.

In the same way 5-methoxy-7-methyl-9-ethoxymethyl-3,4,10-trioxo-1,2,3,4,4a,9,9a,10-octahydroanthracene and 2 - carbethoxy-5-methoxy-8-chloro-9-(1-methoxypropyl)-9a - carbethoxy - 3,4,10-trioxo-1,2,3,4,4a,9,9a,10-octahydroanthracene are prepared.

EXAMPLE XLI 2,9a-dicarbomethoxy-5-methoxy-3,4,10-trioxo-1,2,3,4,4a,9,9a,10-octahydroanthracene 2 - carbomethoxy-2-(2-carbomethoxyethyl)-5-methoxy-4-tetralone is condensed with dimethyl oxalate as in the preceding example to provide this product. The following are prepared in the same way:

2,9a-dicarbethoxy-5-methoxy-8-chloro-3,4,10-trioxo-1,2,3,4,4a,9,9a,10-octahydroanthracene 2,9a-dicarbethoxy-5-hydroxy-3,4,10-trioxo-1,2,3,4,4a,9,9a,10-octahydroanthracene 2-carbo-t-butoxy-5,7-dimethoxy-9-monomethylamino-3,4,10-trioxo-1,2,3,4,4a,9,9a,10-octahydroanthracene 2-carbobenzyloxy-5-methoxy-8-trifluoromethyl-9-amino-3,4,10-trioxo-1,2,3,4,4a,9, 9a,10-octahydroanthracene

EXAMPLE XLII

Tetralones prepared in Examples XXX–XXXIX are condensed with oxalic acid esters by the procedure of Example XL to give octahydroanthracenes of the formula

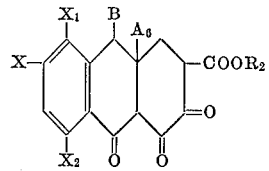

wherein the variables X, X₁, X₂, B, A₆ and R₂ have the values previously given in Examples XXX–XXXIX.

It should be noted that for those tetralone reactants having an active hydrogen, the use of an additional mole of sodium hydride is required.

EXAMPLE XLIII 9a-carboxy-3,4,10-trioxo-1,2,3,4,4a,9,9a,10-octahydroanthracene A mixture of 10 g. of 2,9a-dicarbomethoxy-3,4,10-trioxo - 1,2,3,4,4a,9,10 - octahydroanthracene, 250 ml. of glacial acetic acid, 125 ml. concentrated HCl and 25 ml. of water is heated at 95° C. for 1 hour. The reaction mixture is then poured into 2 liters of cold water and extracted with chloroform. The combined extracts are dried and evaporated to obtain the product as residue.

EXAMPLE XLIV 5-ethoxy-8-trifluoromethyl-9a-carbethoxy-3,4,10-trioxo-1,2,3,4,4a,9,9a,10-octahydroanthracene 5 grams of 2 - carbobenzyloxy - 5 - ethoxy-8-trifluoromethyl - 9a - carbethoxy-3,4,10-trioxo-1,2,3,4,4a,9,9a,10-octahydroanthracene is treated with hydrogen gas at room temperature in acetic acid and in the presence of 0.5 g. of 5% palladium on carbon at 50 p.s.i.g. until one molar equivalent of gas is taken up. The product is obtained by filtration and concentration of the reaction mixture after warming to 60° C. for 20 minutes to ensure complete evolution of carbon dioxide.

EXAMPLE XLV 5-hydroxy-7-methyl-8-chloro-9-methoxymethyl-3,4,10-trioxo-1,2,3,4,4a,9,9a,10-octahydroanthracene 3 grams of 5 - hydroxy - 7-methyl-8-chloro-9-methoxymethyl - 3,4,10 - trioxo - 1,2,3,4,4a,9,9a,10 - octahydroanthracene is refluxed for 3 hours in 10 ml. of acetic acid, 10 ml. of concentrated sulfuric acid and 1 ml. of water. Chloroform is then added and the mixture is poured into excess water. The product is obtained by separation of the chloroform layer, washing, drying over sodium sulfate and concentration to a solid residue.

If desired, further purification is achieved by chromatography on silicic acid with chloroform elution. The product is contained in the less polar effluent fraction.

EXAMPLE XLVI 5-hydroxy-9-hydroxymethyl-3,4,10-trioxo-1,2,3,4,4a,9,9a,10-octahydroanthracene 2 - carbomethoxy - 5 - methoxy-9-methoxymethyl-3,4,10-trioxo-1,2,3,4,4a,9,9a,10-octahydroanthracene, 2 g., is heated with 50 ml. 48% HBr for 45 minutes at 100° C., and the product is recovered by evaporation to dryness under vacuum.

EXAMPLE XLVII

Products such as those of Example XLII are decarboxylated (benzyl esters by hydrogenolysis as in Example XLIV, and lower alkyl esters by the procedures of Examples XLIII, XLV or XLVI) to produce the following compounds. Products wherein B is hydroxylalkyl are prepared by the procedure of Example XLVI. Those compounds containing basic (amino) groups are isolated by adjustment to pH 6 followed by butanol extraction and concentration of the extract.

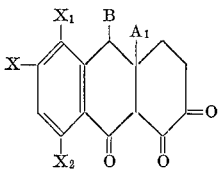

| X | $X_1$ | $X_2$ | B | $A_1$ |
|---|---|---|---|---|
| H | H | H | H | $CO_2H$ |
| H | Et | OMe | H | $CO_2H$ |
| H | $NMe_2$ | OMe | H | $CO_2H$ |
| H | $NH_2$ | OMe | H | $CO_2H$ |
| H | NHAc | OMe | H | $CO_2Me$ |
| Me | Cl | OH | H | $CO_2Pr$ |
| i-Pr | Cl | OH | H | $CO_2Bz$ |
| Et | Et | OH | H | $CO_2H$ |
| H | Cl | OBz | H | $CO_2Et$ |
| H | Cl | OH | H | $CO_2Bu$ |
| $NH_2$ | Cl | OMe | H | $CO_2H$ |
| Et | Cl | OMe | H | $CO_2H$ |
| Me | Cl | OMe | H | $CO_2H$ |
| $NMe_2$ | Cl | OH | H | $CO_2H$ |
| Me | Me | H | H | $CO_2H$ |
| H | Cl | OH | H | $CO_2H$ |
| H | Cl | OMe | H | $CO_2H$ |
| OMe | H | OMe | H | H |
| OMe | H | OMe | H | $CO_2H$ |
| H | NHAc | OMe | H | $CO_2H$ |
| H | NHAc | OBz | H | $CO_2H$ |
| OMe | H | H | H | $CO_2Me$ |
| OMe | H | H | H | H |
| H | OMe | H | H | $CO_2H$ |
| Me | H | OMe | H | $CO_2H$ |
| NHAc | H | OMe | H | H |
| OMe | H | H | H | Et |
| Me | Me | H | H | $CO_2Me$ |
| Et | Cl | OMe | H | H |
| H | Cl | OMe | H | $CO_2Me$ |
| H | Cl | OMe | H | $CO_2H$ |
| H | Me | OH | H | H |
| Me | Me | OH | H | $CO_2H$ |
| H | Cl | OH | H | $CO_2H$ |
| H | Me | OMe | H | $CO_2Bz$ |
| Me | Cl | OMe | H | $CO_2H$ |
| OMe | H | OMe | H | $CO_2H$ |
| H | Cl | OH | H | $CO_2H$ |
| i-Pr | H | OH | H | $CO_2H$ |
| H | $NH_2$ | OBz | H | $CO_2H$ |
| H | Pr | OPr | H | $CO_2H$ |
| H | H | OH | H | $CO_2H$ |
| H | H | OMe | H | $CO_2H$ |
| H | H | OMe | H | $CO_2H$ |
| H | H | OMe | H | $CO_2H$ |
| H | H | OMe | H | $CO_2H$ |
| H | H | OH | H | $CO_2Pr$ |
| H | H | OH | H | $CO_2H$ |
| H | H | OH | H | $CO_2H$ |
| OCOMe | Cl | OEt | H | $CO_2H$ |
| $CF_3$ | $CF_3$ | OMe | H | Me |
| OBu | $CF_3$ | OBu | H | $CO_2Et$ |
| NHEt | $CF_3$ | OMe | H | Et |
| $NHCOPr$ | H | H | H | $CO_2H$ |
| H | $CF_3$ | OH | H | $CO_2H$ |
| OH | Cl | OH | H | $CO_2H$ |
| NHAc | H | OH | H | H |
| $CF_3$ | H | OH | H | $CO_2Et$ |
| OH | H | H | H | $CO_2H$ |
| H | Hα | OBz | H | $CO_2Et$ |
| $NH_2$ | H | OMe | H | H |
| Pr | N | OMe | H | $CO_2H$ |
| Me | H | OMe | H | H |
| $NMe_2$ | H | OH | H | $CO_2H$ |
| H | $CF_3$ | H | H | $CO_2H$ |
| Et | H | OMe | H | $CO_2H$ |
| OMe | Cl | H | H | $CO_2H$ |
| NHAc | Cl | OMe | H | $CO_2H$ |

| X | $X_1$ | $X_2$ | B | $A_1$ |
|---|---|---|---|---|
| H | $CF_3$ | H | H | $CO_2H$ |
| H | $CF_3$ | OMe | H | $CO_2H$ |
| H | H | OEt | H | $CO_2H$ |
| H | Me | OMe | H | $CO_2H$ |
| H | Cl | OCOEt | H | H |
| H | Cl | OCOMe | H | H |
| i-Pr | H | OMe | H | $CO_2H$ |
| OCOMe | H | H | H | H |
| OCOEt | H | H | H | H |
| OBz | H | H | H | $CO_2Me$ |
| Me | H | OH | H | H |
| H | Cl | OBz | H | $CO_2Me$ |
| NHMe | H | OPr | H | H |
| OBz | H | H | H | $CO_2H$ |
| NHAc | H | H | H | $CO_2H$ |
| Et | Et | H | H | $CO_2H$ |
| H | NHMe | OMe | H | $CO_2H$ |
| OMe | H | OBz | H | $CO_2H$ |
| OCOMe | H | OMe | H | $CO_2H$ |
| Et | i-Pr | OMe | H | $CO_2H$ |
| Me | H | OPr | H | $CO_2Bz$ |
| H | Cl | OH | H | $CO_2H$ |
| Me | Cl | OH | H | H |
| Et | Et | OH | H | H |
| H | Cl | OBz | H | H |
| H | Cl | OCOEt | H | H |
| H | Cl | OBz | H | H |
| H | Cl | OPr | H | H |
| H | Cl | OH | H | H |
| H | Cl | OMe | H | H |
| $NH_2$ | Cl | OMe | H | H |
| $NMe_2$ | Cl | OH | H | Me |
| Pr | Cl | OMe | CHO | $CO_2H$ |
| H | $NMe_2$ | OMe | CHO | H |
| H | Et | OMe | CHO | H |
| H | $NH_2$ | OMe | CHO | H |
| H | NHAc | OMe | CHO | H |
| H | Cl | OMe | CHO | H |
| H | NHAc | OEt | CHO | H |
| Me | H | OMe | CHO | H |
| OMe | H | OMe | CHO | H |
| H | H | OMe | CHO | H |
| $CF_3$ | H | H | CHO | H |
| $CF_3$ | H | OH | CHO | H |
| H | Cl | OH | $CH(CH_3)OMe$ | H |
| H | NHAc | OEt | $CH_2OMe$ | H |
| Me | H | OMe | $CH_2OPr$ | H |
| OMe | H | OMe | $CH_2OMe$ | H |
| H | Cl | OMe | $CH_2OMe$ | H |
| Me | Cl | OH | $CH(C_5H_{11})OH$ | H |
| H | H | OMe | $CH_2OMe$ | H |
| H | Cl | OMe | $CH(C_2H_5)OEt$ | H |
| $CF_3$ | H | H | $CH_2OMe$ | H |
| NHAc | Cl | OH | $CH(CH_3)OMe$ | H |
| Me | H | OMe | $CH(CH_3)OMe$ | H |
| $CF_3$ | Cl | OH | $CH_2OMe$ | H |
| H | Cl | OMe | $CH_2OMe$ | H |
| Me | H | OMe | $CH_2OEt$ | H |
| $CF_3$ | H | H | $CH_2OH$ | H |
| H | Cl | OH | $CH(CH_3)OH$ | H |
| H | NHAc | OEt | $CH_2OH$ | H |
| Me | H | OMe | $CH_2OH$ | H |
| OMe | H | OMe | $CH_2OH$ | H |
| H | Cl | OMe | $CH_2OH$ | H |
| Me | H | OMe | $CH_2OH$ | H |
| H | H | OMe | $CH_2OH$ | H |
| H | Cl | OMe | $CH(C_2H_5)OH$ | H |
| $CF_3$ | H | H | $CH_2OH$ | H |
| NHAc | Cl | OH | $CH(CH_3)OH$ | H |
| Me | H | OMe | $CH(CH_3)OH$ | H |
| $CF_3$ | H | OH | $CH_2OH$ | H |
| H | Cl | OMe | $CH_2OH$ | H |
| H | $NO_2$ | OMe | $CH_2OH$ | H |
| Me | Cl | OMe | $CH_2OH$ | H |
| H | Cl | OBz | $NMe_2$ | H |
| Pr | H | OMe | $CH_2OEt$ | Me |
| $NMe_2$ | H | OMe | $CH(CH_3)OH$ | $CO_2Me$ |
| H | Cl | OMe | $CH_2OMe$ | H |
| Me | Cl | OH | $CH_2OMe$ | H |
| H | Cl | OCOEt | $NEt_2$ | H |
| H | Cl | OCOMe | MeNEt | H |
| $NH_2$ | Cl | OMe | $NPr_2$ | H |
| Et | Cl | OMe | MeNCOEt | H |
| $NMe_2$ | Cl | OH | NHAc | H |
| H | Cl | OH | $NEt_2$ | H |
| H | Cl | OMe | MeNEt | H |
| H | H | OMe | MeNAc | H |
| Me | Cl | OMe | $NMe_2$ | $CO_2H$ |
| H | Cl | OBz | $NMe_2$ | H |
| H | Cl | OPr | $NEt_2$ | H |
| H | $NH_2$ | OBz | $NMe_2$ | $CO_2H$ |
| H | Pr | OPr | NHAc | $CO_2H$ |
| H | H | H | NHAc | $CO_2H$ |
| $CF_3$ | $CF_3$ | OMe | $NMe_2$ | Me |
| OMe | Cl | H | NHAc | $CO_2H$ |
| H | $CF_3$ | OMe | $NMe_2$ | $CO_2H$ |
| H | Me | OMe | $NMe_2$ | $CO_2H$ |
| $NMe_2$ | H | OH | $NMe_2$ | H |
| OMe | H | OMe | $NMe_2$ | H |
| Et | Et | OH | $NMe_2$ | H |
| Et | Et | OH | $NMe_2$ | H |
| NHMe | H | OPr | $NMe_2$ | $CO_2H$ |
| OCOMe | H | OMe | NHAc | $CO_2H$ |
| OBz | H | H | $NMe_2$ | $CO_2H$ |
| H | Cl | OH | H | $CO_2Bz$ |
| H | H | H | H | $CO_2H$ |
| Me | Cl | OH | H | $CO_2Et$ |
| i-Pr | Cl | OH | H | $CO_2H$ |

| X | $X_1$ | $X_2$ | B | $A_1$ |
|---|---|---|---|---|
| H | Cl | OH | H | $CO_2H$ |
| H | Cl | OH | H | $CO_2H$ |
| H | Et | OMe | H | H |
| H | $NMe_2$ | OMe | $CH_2OMe$ | H |
| H | NHAc | OMe | $CH_2OMe$ | H |
| NHAc | H | OMe | $CH_2OMe$ | $CO_2Pr$ |
| H | H | OBz | $NMe_2$ | H |
| Me | H | OMe | $CH_2OEt$ | Et |
| H | H | H | $NMe_2$ | H |
| i-Pr | H | OMe | $CH(CH_3)OMe$ | H |
| H | Me | OMe | $NMe_2$ | H |

What is claimed is:
1. A compound of the formula

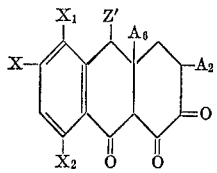

wherein

X is selected from the group consisting of hydrogen, hydroxy, trifluoromethyl, lower alkyl, amino, mono and di-lower alkylamino, alkanoylamino containing from 2 to 4 carbon atoms, alkanoyloxy containing from 2 to 4 carbon atoms; and OR wherein R is selected from the group consisting of lower alkyl and benzyl;

$X_1$ is selected from the group consisting of hydrogen, chloro, lower alkyl, trifluoromethyl;

$X_2$ is selected from the group consisting of hydrogen, hydroxy, and OR, wherein R is as previously defined;

$A_6$ is selected from the group consisting of hydrogen, carboxy, lower carbalkoxy and carbobenzyloxy;

Z' is selected from the group consisting of hydrogen, $-CH(R_4)OR_8$ wherein $R_4$ and $R_8$ are each selected from the group consisting of hydrogen and lower alkyl and $-NR_5R_6$ wherein $R_5$ is selected from the group consisting of hydrogen and lower alkyl and $R_6$ is selected from the group consisting of hydrogen, lower alkyl and lower alkanoyl, provided that $R_6$ is lower alkanoyl when $R_5$ is hydrogen;

$A_2$ is selected from the group consisting of hydrogen, carboxy, lower carbalkoxy and carbobenzyloxy;

and only one of $A_6$ and Z' is hydrogen at the same time.

2. The compound of claim 1 wherein X, $X_1$ and $A_2$ are each hydrogen; $X_2$ is methoxy; Z' is $-CH_2-OCH_3$; and $A_6$ is carbomethoxy.

3. The compound of claim 1 wherein X and Z' are each hydrogen; $X_1$ is chloro; $X_2$ is methoxy; and $A_2$ and $A_6$ are each carbethoxy.

4. The compound of claim 1 wherein X, $A_2$ and $A_6$ are each hydrogen; $X_2$ is methoxy; $X_1$ is methyl; and Z' is dimethylamino.

5. The compound of claim 1 wherein X, $X_1$, $A_2$ and $A_6$ are each hydrogen; $X_2$ is benzyloxy; and Z' is dimethylamino.

References Cited

UNITED STATES PATENTS

| 3,167,579 | 1/1965 | Fields et al. | 260—351 |
| 3,201,462 | 8/1965 | Wilkinson et al. | 260—351 |
| 3,409,616 | 11/1968 | Conover | 260—351 |

LORRAINE A. WEINBERGER, Primary Examiner

E. J. SKELLY, Assistant Examiner

U.S. Cl. X.R.

260—239.3, 345.8, 465, 469, 470, 471, 473, 475, 515, 516, 518, 519, 520, 521, 559, 999

UNITED STATES PATENT OFFICE
CERTIFICATE OF CORRECTION

Patent No. 3,549,663      Dated December 22, 1970

Inventor(s) Lloyd H. Conover et al

It is certified that error appears in the above-identified patent and that said Letters Patent are hereby corrected as shown below:

Col. 4, lines 35-42, that portion of the first formula reading

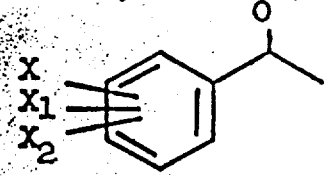    "    should read    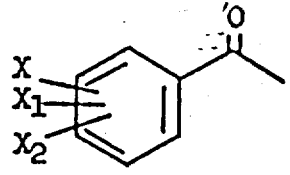 .

Col. 5, lines 46-52, that portion of formula VII reading

" 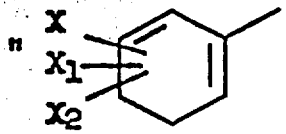 "    should read -- 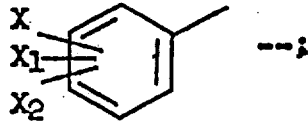 --;

lines 68-75, that portion of formula VI reading

" 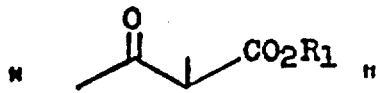 "    should read -- 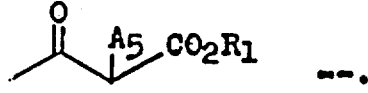 --.

Col. 8, lines 20-29, that portion of formula XXI reading

" 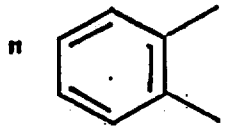 "    should read -- 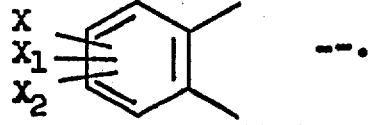 --.

Col. 16, lines 37-38, the compound should read -- diethyl 3-carbomethoxy-3-(2-isopropyl-3-ethyl-5-methoxybenzyl)adipate --;
     line 53, "(3-trifluoromethyl" should read -- (2-trifluoromethyl --.
Col. 19, line 67, "≠" should read -- + --.

UNITED STATES PATENT OFFICE
CERTIFICATE OF CORRECTION

Patent No. 3,549,663      Dated December 22, 1970

Inventor(s) Lloyd H. Conover et al      (Page 2)

It is certified that error appears in the above-identified patent and that said Letters Patent are hereby corrected as shown below:

Col. 28, lines 53-75, should read as though the last line before the break in the table under each of columns "$X_2$" and "$R_2$" and the last four "H" values under column "B" were deleted and the entire separated lower part of the table were moved up to eliminate the separation from the bottom. same column 28, line 74, under "$X_1$" "C" should read -- Cl --.

Signed and sealed this 1st day of June 1971.

(SEAL)
Attest:

EDWARD M. FLETCHER, JR.      WILLIAM E. SCHUYLER, JR.
Attesting Officer      Commissioner of Patents